United States Patent
Gu

(10) Patent No.: US 11,529,610 B2
(45) Date of Patent: Dec. 20, 2022

(54) FUNCTIONALIZED PARTICULATE SUPPORT MATERIAL AND METHODS OF MAKING AND USING THE SAME

(71) Applicant: W. R. Grace & Co.-Conn., Columbia, MD (US)

(72) Inventor: Feng Gu, Ellicott City, MD (US)

(73) Assignee: W.R. GRACE & CO.-CONN., Columbia, MD (US)

( * ) Notice: Subject to any disclaimer, the term of this patent is extended or adjusted under 35 U.S.C. 154(b) by 270 days.

(21) Appl. No.: 14/374,795

(22) PCT Filed: Sep. 16, 2013

(86) PCT No.: PCT/US2013/059995
§ 371 (c)(1),
(2) Date: Jul. 25, 2014

(87) PCT Pub. No.: WO2014/043644
PCT Pub. Date: Mar. 20, 2014

(65) Prior Publication Data
US 2015/0251158 A1  Sep. 10, 2015

Related U.S. Application Data

(60) Provisional application No. 61/702,174, filed on Sep. 17, 2012.

(51) Int. Cl.
| | | |
|---|---|---|
| *B01J 20/283* | (2006.01) | |
| *B01J 20/24* | (2006.01) | |
| *B01J 20/02* | (2006.01) | |
| *B01J 20/04* | (2006.01) | |
| *B01J 20/26* | (2006.01) | |
| *B01D 15/36* | (2006.01) | |
| *B65B 3/04* | (2006.01) | |
| *B65B 7/02* | (2006.01) | |
| *C08F 222/38* | (2006.01) | |

(Continued)

(52) U.S. Cl.
CPC .......... *B01J 20/283* (2013.01); *B01D 15/361* (2013.01); *B01J 20/0229* (2013.01); *B01J 20/0248* (2013.01); *B01J 20/04* (2013.01); *B01J 20/24* (2013.01); *B01J 20/261* (2013.01); *B01J 20/262* (2013.01); *B01J 20/264* (2013.01); *B65B 3/04* (2013.01); *B65B 7/02* (2013.01); *C08F 222/38* (2013.01); *B01J 2220/44* (2013.01); *B01J 2220/46* (2013.01); *B01J 2220/52* (2013.01); *B01J 2220/58* (2013.01); *B01J 2220/62* (2013.01); *G01N 30/96* (2013.01); *G01N 2030/8813* (2013.01); *Y10T 428/2982* (2015.01)

(58) Field of Classification Search
CPC . B01J 20/02; B01J 20/10; B01J 20/103; B01J 20/22; B01J 20/286; B01J 20/287; B01J 20/288; B01J 20/289; B01J 20/332; B01J 20/3231; B01J 20/3204; B01J 20/3242; B01J 20/3285; B01J 20/3289; B01J 20/3244; B01J 20/3248; B01J 20/3251; B01J 20/28; B01J 20/28004; B01J 20/28016; B01J 2220/46; B01J 2220/44; B01J 20/283; B01J 2/282; B01J 20/281; B01J 20/282; B01D 15/26; B01D 15/32; B01D 15/322; B01D 15/361; G01N 30/48; G01N 30/482; G01N 2030/484; B65B 3/04; B65B 7/02; C08F 222/38
See application file for complete search history.

(56) References Cited

U.S. PATENT DOCUMENTS

| | | | |
|---|---|---|---|
| 4,029,583 A | 6/1977 | Ho Chang et al. | ........... 252/184 |
| 4,118,316 A | 10/1978 | Talley et al. | ................ 210/31 C |

(Continued)

FOREIGN PATENT DOCUMENTS

| | | | |
|---|---|---|---|
| CA | 1303594 | 6/1992 | |
| CN | 101381437 | 5/2011 | ........... C08F 292/00 |

(Continued)

OTHER PUBLICATIONS

Machine Translation of KR 20090055966, originally published Jun. 3, 2009. (Year: 2009).*
Kamath et al. Silica gel from rice hull ash: preparation and characterization. Cereal Chemistry, vol. 75, No. 4, 1998, p. 484-487. (Year: 1998).*
Clairbois et al.; "Heparin Grafted Silica Beads for High Performance Affinity Chromatography of Proteins from Smooth Muscle Cell Membranes;" 51 International Journal of Biochromatography, vol. 4(1), 1998, pp. 1-13.
Muller; "New Ion Exchangers for the Chromatography of Biopolymers;" Journal of Chromatography, 510 (1990), pp. 133-140.

(Continued)

*Primary Examiner* — Ryan B Huang
(74) *Attorney, Agent, or Firm* — Foley & Lardner LLP

(57) ABSTRACT

Functionalized particulate support material and chromatographic media prepared therefrom are disclosed. The functionalized particulate support material is a plurality of particles, each particle having a particle surface. Chemically bonded to and extending from the surface of the particles is a combination of hydrophobic and hydrophilic functional groups. The hydrophobic functional groups enable polymerization of one or more monomers onto the particle surface while the hydrophilic functional groups provide increased wettability of the particle surface compared to an unmodified particle surface. The functionalized particulate support material may be further processed so as to form polymer chains extending from the hydrophobic functional groups. In one embodiment, the resulting polymer functionalized material is useful as a chromatographic media in chromatography columns or cartridges, such as in a liquid chromatography (HPLC) column. Chromatography columns or cartridges containing the polymer functionalized media, and methods of making and using the media, are also disclosed.

8 Claims, 5 Drawing Sheets

(51) Int. Cl.
  *G01N 30/88* (2006.01)
  *G01N 30/96* (2006.01)

(56) References Cited

U.S. PATENT DOCUMENTS

| | | | | |
|---|---|---|---|---|
| 4,397,827 | A | 8/1983 | Chu | 423/326 |
| 4,415,631 | A * | 11/1983 | Schutijser | C08F 292/00 |
| | | | | 210/198.2 |
| 4,517,131 | A | 5/1985 | Hefner, Jr. | 260/465 F |
| 4,581,428 | A | 4/1986 | Farnham et al. | 526/190 |
| 4,650,784 | A * | 3/1987 | Ramsden | B01J 20/3257 |
| | | | | 502/407 |
| 4,724,207 | A | 2/1988 | Hou et al. | 435/180 |
| 4,745,097 | A | 5/1988 | Maekawa et al. | 503/209 |
| 4,756,834 | A | 7/1988 | Muller et al. | 210/635 |
| 4,783,264 | A | 11/1988 | Nylen et al. | 210/638 |
| 4,917,781 | A | 4/1990 | Sharifian et al. | 204/72 |
| 4,956,180 | A | 9/1990 | Cassani et al. | 424/118 |
| 5,035,803 | A | 7/1991 | Cohen | 210/656 |
| 5,057,426 | A | 10/1991 | Henco et al. | 435/270 |
| 5,059,654 | A * | 10/1991 | Hou | B01J 47/127 |
| | | | | 210/198.2 |
| 5,099,923 | A | 3/1992 | Aften et al. | 166/294 |
| 5,152,906 | A | 10/1992 | Aften et al. | 252/8.551 |
| 5,190,660 | A | 3/1993 | Lindoy et al. | 210/670 |
| 5,190,844 | A | 3/1993 | Yabuuchi et al. | 430/137 |
| 5,203,991 | A | 4/1993 | Kutsuna et al. | 210/198.2 |
| 5,230,833 | A | 7/1993 | Romberger et al. | 252/363.5 |
| 5,306,561 | A | 4/1994 | Frechet et al. | |
| 5,318,848 | A | 6/1994 | Itoh et al. | 428/405 |
| 5,380,706 | A | 1/1995 | Himes et al. | 507/129 |
| 5,401,809 | A | 3/1995 | Gitzel et al. | 525/337 |
| 5,453,186 | A | 9/1995 | Muller et al. | 210/198.2 |
| 5,593,576 | A | 1/1997 | Girot et al. | 210/198.2 |
| 5,593,757 | A | 1/1997 | Kashiwazaki et al. | 428/195 |
| 5,701,956 | A | 12/1997 | Hardy et al. | 166/295 |
| 5,805,264 | A | 9/1998 | Janssen et al. | 351/160 R |
| 5,856,379 | A * | 1/1999 | Shiratsuchi | C08K 3/36 |
| | | | | 428/403 |
| 5,906,747 | A | 5/1999 | Coffman et al. | 210/635 |
| 5,914,044 | A | 6/1999 | Lindoy et al. | 210/670 |
| 6,090,288 | A * | 7/2000 | Berglund | B01D 15/363 |
| | | | | 210/198.2 |
| 6,127,526 | A | 10/2000 | Blank et al. | 530/413 |
| 6,204,306 | B1 | 3/2001 | Chabrecek et al. | 523/106 |
| 6,379,500 | B2 | 4/2002 | Greenwood et al. | 162/181.6 |
| 6,383,990 | B1 | 5/2002 | Dawson et al. | 507/209 |
| 6,426,315 | B1 * | 7/2002 | Bergstrom | C08B 37/0021 |
| | | | | 502/159 |
| 6,428,707 | B1 * | 8/2002 | Berg | B01D 15/362 |
| | | | | 210/198.2 |
| 6,497,964 | B1 | 12/2002 | Matsumura et al. | 428/447 |
| 6,512,060 | B1 | 1/2003 | Matyjaszewski et al. | 526/111 |
| 6,624,205 | B2 | 9/2003 | Muranaka | 521/25 |
| 6,649,572 | B2 | 11/2003 | Dawson et al. | 507/209 |
| 6,696,585 | B1 | 2/2004 | Wellinghoff et al. | |
| 6,797,814 | B2 | 9/2004 | Blank | 530/413 |
| 6,818,259 | B1 | 11/2004 | Koontz | 427/562 |
| 6,852,009 | B2 | 2/2005 | Kawase et al. | 431/36 |
| 6,861,103 | B2 | 3/2005 | Chang et al. | 427/522 |
| 6,916,536 | B1 | 7/2005 | Hammen et al. | 428/407 |
| 6,949,613 | B2 | 9/2005 | Haddleton | 526/90 |
| 6,994,791 | B2 | 2/2006 | Muller et al. | 210/656 |
| 6,994,964 | B1 | 2/2006 | Chang et al. | 435/6 |
| 7,008,542 | B2 * | 3/2006 | Belew | B01J 39/04 |
| | | | | 210/660 |
| 7,012,044 | B2 | 3/2006 | Dawson et al. | 507/211 |
| 7,067,059 | B2 | 6/2006 | Maloisel | 210/635 |
| 7,128,884 | B2 | 10/2006 | Kirkland et al. | 423/335 |
| 7,192,560 | B2 | 3/2007 | Parthasarathy et al. | 422/101 |
| 7,198,855 | B2 | 4/2007 | Liebmann-Vinson et al. | 428/447 |
| 7,250,253 | B1 | 7/2007 | Klapproth et al. | 435/6 |
| 7,323,347 | B2 | 1/2008 | Quinn | 436/518 |
| 7,332,327 | B2 | 2/2008 | Vikholm et al. | 435/287.2 |
| 7,338,768 | B1 | 3/2008 | Trau et al. | 435/7.1 |
| 7,378,479 | B2 | 5/2008 | Tamareselvy et al. | 526/333 |
| 7,396,561 | B2 | 7/2008 | Ruhe | 427/214 |
| 7,560,258 | B2 | 7/2009 | Brueggmeier | 435/174 |
| 7,683,011 | B2 | 3/2010 | Putzig | 507/273 |
| 7,732,383 | B2 | 6/2010 | Putzig | 507/271 |
| 7,736,612 | B2 | 6/2010 | Kubota | 423/335 |
| 7,754,660 | B2 | 7/2010 | Putzig | 507/271 |
| 7,790,657 | B2 | 9/2010 | Putzig | 507/273 |
| 7,795,189 | B2 | 9/2010 | Putzig | 507/271 |
| 7,795,190 | B2 | 9/2010 | Putzig | 507/273 |
| 7,851,417 | B2 | 12/2010 | Putzig | 507/271 |
| 7,875,317 | B2 | 1/2011 | Nakagawa et al. | 427/387 |
| 7,943,046 | B2 | 5/2011 | Martosella et al. | 210/635 |
| 7,960,311 | B2 | 6/2011 | Carlson | 506/13 |
| 8,334,044 | B2 * | 12/2012 | Myung | A61L 27/06 |
| | | | | 428/141 |
| 8,658,277 | B2 * | 2/2014 | Wyndham | B01J 20/28095 |
| | | | | 210/198.2 |
| 8,791,220 | B2 * | 7/2014 | Jiang | B01J 20/26 |
| | | | | 428/402 |
| 2002/0006493 | A1 | 1/2002 | Chabrecek et al. | 428/64.1 |
| 2002/0012982 | A1 | 1/2002 | Blakesley et al. | 435/183 |
| 2002/0028520 | A1 | 3/2002 | Boschetti et al. | 436/518 |
| 2002/0043499 | A1 | 4/2002 | Hammen et al. | 210/656 |
| 2002/0127587 | A1 | 9/2002 | Simms et al. | 435/6 |
| 2003/0017464 | A1 | 1/2003 | Pohl | 435/6 |
| 2003/0075508 | A1 | 4/2003 | Woodruff et al. | 210/683 |
| 2003/0108879 | A1 | 6/2003 | Klaerner et al. | 435/6 |
| 2003/0144421 | A1 | 7/2003 | Dixon et al. | |
| 2003/0171443 | A1 | 9/2003 | Erbacher | 521/27 |
| 2003/0225261 | A1 | 12/2003 | Taylor et al. | 536/25.5 |
| 2004/0028901 | A1 | 2/2004 | Rumpf et al. | 428/375 |
| 2004/0058059 | A1 | 3/2004 | Linford | 427/58 |
| 2004/0127648 | A1 | 7/2004 | Guerrer et al. | 525/227 |
| 2004/0224843 | A1 | 11/2004 | Hammen et al. | 502/402 |
| 2005/0100905 | A1 | 5/2005 | Nassoy et al. | 435/6 |
| 2005/0106602 | A1 | 5/2005 | Akhavan-Tafti | 435/6 |
| 2005/0269257 | A1 | 12/2005 | Voute et al. | 210/502.1 |
| 2006/0009546 | A1 | 1/2006 | Brown | |
| 2006/0041035 | A1 | 2/2006 | Poppe et al. | 523/200 |
| 2006/0058181 | A1 | 3/2006 | Margetts | 502/159 |
| 2006/0093836 | A1 | 5/2006 | Huang et al. | |
| 2006/0144770 | A1 | 7/2006 | Granger et al. | 210/198.2 |
| 2006/0240633 | A1 | 10/2006 | Martosella et al. | 438/348 |
| 2006/0269464 | A1 * | 11/2006 | Turkay | C10L 1/026 |
| | | | | 423/331 |
| 2007/0135304 | A1 * | 6/2007 | Walter | B01J 20/28033 |
| | | | | 502/402 |
| 2007/0141325 | A1 | 6/2007 | O'Gara et al. | 428/332 |
| 2007/0178465 | A1 | 8/2007 | Sudor et al. | 435/6 |
| 2007/0181482 | A1 | 8/2007 | Abudokirim et al. | 210/321.6 |
| 2007/0193954 | A1 | 8/2007 | Busson | 210/656 |
| 2007/0276131 | A1 | 11/2007 | Ferre et al. | 530/420 |
| 2008/0026486 | A1 | 1/2008 | Cooper et al. | 436/518 |
| 2008/0038750 | A1 | 2/2008 | Piehler et al. | 435/7.1 |
| 2008/0071003 | A1 | 3/2008 | Seilergren et al. | |
| 2008/0146454 | A1 | 6/2008 | Cuppoletti | 506/6 |
| 2008/0153100 | A1 | 6/2008 | Rank et al. | 435/6 |
| 2008/0154029 | A1 | 6/2008 | Balayan et al. | 536/25.4 |
| 2008/0185333 | A1 * | 8/2008 | Gibson | B01J 20/286 |
| | | | | 210/508 |
| 2008/0210615 | A1 | 9/2008 | Joehnck et al. | 210/198.2 |
| 2008/0236824 | A1 | 10/2008 | Putzig | 166/280.1 |
| 2009/0035876 | A1 | 2/2009 | Williams et al. | 436/529 |
| 2009/0048439 | A1 | 2/2009 | Weisburg et al. | 536/25.41 |
| 2009/0074709 | A1 | 3/2009 | Koepsel et al. | 424/78.32 |
| 2009/0127501 | A1 | 5/2009 | Kashima | 252/79.5 |
| 2009/0151946 | A1 | 6/2009 | Putzig | 166/280.2 |
| 2009/0151947 | A1 | 6/2009 | Putzig | 166/280.2 |
| 2009/0156389 | A1 * | 6/2009 | Ryoo | C01B 39/04 |
| | | | | 502/64 |
| 2009/0170973 | A1 | 7/2009 | Mattiasson et al. | 521/134 |
| 2009/0186093 | A1 | 7/2009 | Liu et al. | 424/497 |
| 2009/0232950 | A1 * | 9/2009 | Brothers, Jr. | A23L 2/80 |
| | | | | 426/271 |
| 2009/0294362 | A1 | 12/2009 | Persson et al. | 210/656 |
| 2009/0297853 | A1 | 12/2009 | Kirkland et al. | 428/403 |

(56) References Cited

U.S. PATENT DOCUMENTS

| | | | | |
|---|---|---|---|---|
| 2009/0306292 | A1 | 12/2009 | Bendejacq et al. | 525/55 |
| 2009/0308599 | A1 | 12/2009 | Dusternoft et al. | 166/249 |
| 2010/0099579 | A1 | 4/2010 | Chikoti et al. | 506/16 |
| 2010/0129830 | A1 | 5/2010 | Deshayes et al. | 435/7.1 |
| 2010/0156135 | A1 | 6/2010 | Farokhzad et al. | 424/9.1 |
| 2010/0159254 | A1 | 6/2010 | Oertli et al. | 428/447 |
| 2010/0181254 | A1 | 7/2010 | Graalfs | 210/656 |
| 2010/0237019 | A1 | 9/2010 | Aldegonda et al. | 210/670 |
| 2010/0310539 | A1* | 12/2010 | Garcia-Bennett | A61K 8/11 424/94.1 |
| 2010/0310865 | A1 | 12/2010 | Kumar et al. | 428/352 |
| 2011/0049042 | A1 | 3/2011 | DiLeo et al. | 210/490 |
| 2011/0201078 | A1* | 8/2011 | Rasmussen | C08F 220/60 435/183 |
| 2011/0245077 | A1 | 10/2011 | Anderson et al. | 502/402 |
| 2012/0156135 | A1 | 6/2012 | Farokhzad et al. | |
| 2013/0020523 | A1* | 1/2013 | Han | C09C 1/3669 252/62.2 |

FOREIGN PATENT DOCUMENTS

| | | | |
|---|---|---|---|
| CN | 103289030 A | 9/2013 | |
| EP | 0106769 | 1/1987 | B01J 20/32 |
| EP | 0545677 | 6/1993 | C09K 7/02 |
| EP | 0300273 | 3/1994 | C07G 11/00 |
| EP | 0520109 | 3/1995 | C01B 33/14 |
| EP | 0463036 | 9/1995 | C12Q 1/68 |
| EP | 0490300 | 3/1998 | G03G 9/08 |
| EP | 0950067 | 10/1999 | C07K 16/06 |
| EP | 1 095 711 A2 | 5/2001 | |
| EP | 1229094 | 8/2002 | C09G 1/02 |
| EP | 1864999 | 12/2007 | C07K 16/06 |
| EP | 1897890 | 3/2008 | C07K 16/06 |
| EP | 1900751 | 3/2008 | C07K 16/06 |
| JP | 59050052 | 3/1984 | C08K 9/00 |
| JP | 59050054 | 3/1984 | C08K 9/00 |
| JP | S59500656 A | 4/1984 | |
| JP | 8134138 | 5/1996 | C08L 33/14 |
| JP | 2009031277 A | 2/2009 | |
| JP | 2012032390 A | 2/2012 | |
| JP | 2012254981 A | 12/2012 | |
| KR | 20090055966 | * 6/2009 | |
| WO | 9400237 | 1/1994 | B01J 39/18 |
| WO | 9403268 | 2/1994 | B01J 8/00 |
| WO | 9525789 | 9/1995 | C12N 7/02 |
| WO | 9705174 | 2/1997 | C08F 4/46 |
| WO | 0102452 | 1/2001 | C08F 292/00 |
| WO | 0188520 | 11/2001 | G01N 27/00 |
| WO | 0228912 | 4/2002 | C08F 4/00 |
| WO | 03031580 | 4/2003 | |
| WO | 03049671 | 6/2003 | |
| WO | 2004009677 | 1/2004 | C08G 77/46 |
| WO | 2004024318 | 3/2004 | B01J 20/32 |
| WO | 2004076511 | 9/2004 | |
| WO | 2005005548 A1 | 1/2005 | |
| WO | 2006110314 | 10/2006 | |
| WO | 2008027262 | 3/2008 | G03F 7/00 |
| WO | 2008140652 | 11/2008 | C09C 3/04 |
| WO | 2009079325 | 6/2009 | C09K 8/508 |
| WO | 2009150402 | 12/2009 | E21B 43/25 |
| WO | 2011012302 | 2/2011 | B01J 20/32 |
| WO | 2011072873 | 6/2011 | C07K 1/22 |
| WO | 2013162449 A1 | 10/2013 | |
| WO | 2014043644 A1 | 3/2014 | |

OTHER PUBLICATIONS

Gong et al.; "Preparation of Weak Anion Exchange Chromatographic Packings Based on Monodisperse Polymer Beads and their Application in the Separation of Biopolymers;" Journal of Chromatography & Related Technologies, 29 (2006), pp. 235-245.

Gu et al; "Silica-Based Strong Anion Exchange Media for Protein Purification;" Journal of Chromatography A, 1376 (2015), pp. 53-63.

Savina, Irina et al. "Anion-Exchange Supermacroporous Monolithic Matrices with Grafted Polymer Brushes of N,N-Dimethylaminoethyl-Methacrylate," Journal of Chromatography A, vol. 1002, No. 2 (2005).

Hernstrom, Petrus et al. "Atom-Transfer Radical Graft Polymerization Initiated Directly from Silica Applied to Functionalization of Stationary Phases for High-Performance Liquid Chromatography in the Hydrophilic Interaction Chromatography Mode," Analytical Chemistry, 78 (2006), pp. 7098-7103.

Tsuneda, S et al. "Biding of Lysozyme onto a Cation-Exchange Microporous Membrane Containing Tentacle-Type Grafted Polymer Branches," Biotechnol Prog., vol. 10, No. 1 (1994).

Search Report for EP2811983 dated Dec. 16, 2014.

Xu, Liang et al. "Fabrication and Characterization of Open-Tubular CEC Modified with Tentacle-Type Metal Chelating Polymer Chains," Electrophoresis, vol. 28, No. 11 (2007).

Buess-Herman, Claudine et al. "Hydration of a Polysulfone Anion-Exchange Membrane Studied by Vibrational Spectroscopy," Langmuir, vol. 19, No. 8 (2003).

Savina, Irina at al. "Ion-Exchange Macroporous Hydrophilic Gel Monolith with Grafted Polymer Brushes." J. Mol. Recognit., vol. 19, No. 4 (2006).

Xu, Liang et al. "Novel Negatively Charged Tentacle-Type Polymer Coating for On-Line Preconcentration of Proteins in CE." Electrophoresis, vol. 30, No. 4 (2009).

Xu, Liang et al. "Novel Open Tubular CEC with Tentacle-Type Polymer Stationary Phase Functionalized by Phenylalanine." Electrophoresis, vol. 29, No. 4 (2008).

PCT Search Report and Written Opinion for PCT/US2013/59995; dated Jan. 29, 2014.

Yanase, Tomohiro et al. "Regeneration Technology of Tetramethylammonium Hydroxide Using Ion Exchange Resin." Technology Reports of Kansai University, No. 47 (2005).

Ma, Z et al. "Synthesis of Magnetic Chelator for High-Capacity Immobilized Metal Affinity Adsorption of Protein by Cerium Initiated Graft Polymerization." Langmuir, vol. 21, No. 15 (2005).

Tessrkmen, Deniz et al. "Synthesis of Tentacle-Type Magnetic Beads as Immobilized Metal-Chelate Affinity Support for Cytochrome C Adsorption," Int. J. Biol. Macromol., vol. 38, No. 2 (2006).

Zhang, Jian et al. "Capillary Electrochromatography of Peptides on a Column Packed with Tentacular Weak Cation-Exchanger Particles," Journal of Chromatography A, 953 (2002), pp. 239-249.

Moon, Jung-Min et al. "Modification of Monodisperse Colloidal Silica by Radical Copolymerization of Cationic Surface Active Vinyl Monomers," Polymer Journal, vol. 41, No. 3 (2009), pp. 208-213.

Mori, Hideharu et al. "Controlled Radical Polyriziation of an Acrylamide Containing L-Phenylalanine Moiety via RAFT." Macromolecules, No. 38, p. 9055-9065 (2005).

Terada K., et al. Syntheses and Properties of Block Copolymers Having Poly (vinyl alcohol) as One Component, Japanese Journal of Polymer Science and Technology, Japan, Nov. 1992, vol. 49, No. 11, p. 885-891.

Koizumi K., Separation and Analysis of Carbohydrates, Journal of Applied Glycoscience, 1994, vol. 41, No. 4, p. 465-471.

Ihara H., Functional Design of Polymer-coated Silica and its High Selectivity, Abstracts from the 14th Symposium on Adsorption, Japan, Aug. 2003, p. 1-7.

Patent Application No. JP 2016-565107 Office Action dated Nov. 1, 2019.

Patent Application No. JP 2017-510439 Office Action dated Mar. 5, 2020.

Patent Application No. 201580036306.5 English translation of First Office Action and Search Report dated Jan. 19, 2020.

* cited by examiner

FUNCTIONALIZED PARTICULATE SUPPORT MATERIAL AND METHODS OF MAKING AND USING THE SAME

FIELD OF THE INVENTION

The present invention relates generally to functionalized particulate support material suitable for use in chromatography columns or cartridges, such as in a liquid chromatography column. The present invention further relates to chromatography columns or cartridges containing the functionalized particulate support material, methods of making functionalized particulate support material, and methods of using functionalized particulate support material, for example, as media in a chromatography column or cartridge.

BACKGROUND OF THE INVENTION

Cation and anionic exchange chromatographic materials are known. Cation exchange chromatographic materials typically contain media having surface attached anionic groups such as sulfonic acid groups (e.g., S strong anion exchange) and/or carboxylic methyl groups (e.g., CM weak cation exchange). Anion exchange chromatographic materials typically contain media having surface attached cationic groups such as quaternary ammonium (e.g., Q strong anion exchange) and/or diethylaminoethyl (e.g., DEAE weak anion exchange).

In separation processes, such as protein purification, given the extremely high molecular weight ($M_W$) of those biomolecules, diffusion of the high $M_W$ biomolecules to the media surface is very limited. To address this problem, the "tentacle" concept was developed and found to be very useful and widely applied. In the "tentacle" concept, tentacles comprising grafted polymer chains are grafted onto the surface of the media. The grafted polymer chains contain repeating units of ionic groups, connected from the end of the polymers to the surface of the media. These polymer chains can rotate freely, allowing interactions between protein molecules and polymeric stationary phase without requirements of the biomolecules to diffuse onto the surface of the media and thus enable high protein loading.

The most common chemistry involved in the tentacle coating concept utilizes the "graft from" concept. In such chemistries, radical polymerization is initiated from the surface of the media particles. For cation exchange media, Ce(IV) salt (e.g., U S. Pat. No. 5,453,186 to E. Merck) is utilized to allow redox chemistry for surface diol groups (e.g., prepared through hydrolysis of attached epoxy groups prior to polymerization) to generate surface radicals, which polymerize sulfonic acid-containing monomers such as 2-acrylamido-2-methyl-1-propanesulfonic acid (AMPS). This chemistry is not environmentally friendly since it generates significant hazardous waste.

Efforts continue to develop cost-effective media suitable for use as cation and/or anionic exchange chromatographic media, as well as chromatography columns or cartridges containing such cost-effective media, including single-use and/or disposable chromatography columns or cartridges.

SUMMARY OF THE INVENTION

The present invention is directed to cost-effective media suitable for use as cation and/or anionic exchange chromatographic materials. The disclosed media, referred to herein as "functionalized particulate support material," is suitable for use in chromatography columns or cartridges, such as in a high performance liquid chromatography (HPLC) column and fast protein liquid chromatography (FPLC).

In one embodiment of the present invention, the functionalized particulate support material comprises a particle having a particle surface; and a combination of functional groups extending from the particle surface, the combination of functional groups comprising (i) a first set of functional groups that enable polymerization of one or more monomers onto the particle surface via the first set of functional groups, and (ii) a second set of functional groups that increases the wettability of the particle surface. In exemplary embodiments of the present invention, the particle comprises an inorganic metal oxide particle (or particles), such as a silica or silica gel particle (or particles), In another embodiment of the present invention, the functionalized particulate support material comprises a particle having a particle surface; and a combination of functional groups extending from the particle surface, the combination of functional groups comprising (i) a first set of functional groups on the particle surface bonded to at least one polymer that extends from the particle surface, and (ii) a second set of functional groups that increases the wettability of the particle surface.

In a further embodiment of the present invention, the functionalized particulate support material comprises a particle having a particle surface and a median pore size of at least 150 Å; and a first set of functional groups extending from the particle surface, said first set of functional groups on the particle surface bonded to at least one polymer that extends from the particle surface. In another embodiment, the functionalized support material includes a second set of functional groups that increases the wettability of said particle surface.

The present invention is further directed to chromatography column or cartridge suitable for use in a chromatography apparatus, wherein the chromatography column or cartridge contains the herein-disclosed functionalized particulate support material of the present invention. In an exemplary embodiment of the present invention, the chromatography column or cartridge comprises a column structure having a column volume; and functionalized particulate support material positioned in the column volume of the column structure, wherein the functionalized particulate support material comprises a plurality of particles, wherein one or more particles within the plurality of particles comprise a particle having a particle surface; and a combination of functional groups extending from the particle surface, the combination of functional groups comprising (i) a first set of functional groups that enable polymerization of one or more monomers onto the particle surface via the first set of functional groups, and (ii) a second set of functional groups that increases the wettability of the particle surface.

The present invention is even further directed to a chromatography apparatus comprising the herein-disclosed chromatography column or cartridge. In one exemplary embodiment, the chromatography apparatus of the present invention comprises a chromatography column or cartridge containing functionalized particulate support material, wherein the functionalized particulate support material comprises a plurality of particles, wherein one or more particles within the plurality of particles comprise a particle having a particle surface; and a combination of functional groups extending from the particle surface, the combination of functional groups comprising (i) a first set of functional groups that enable polymerization of one or more monomers onto the particle surface via the first set of functional groups, and (ii) a second set of functional groups that increases the wettability of the particle surface.

The present invention is also directed to methods of making functionalized particulate support material. In one exemplary embodiment the method of making functionalized particulate support material comprises treating a particle surface of a particle so as to result in a combination of functional groups extending from the particle surface, the combination of functional groups comprising (i) a first set of functional groups that enable polymerization of one or more monomers onto the particle surface via the first set of functional groups, and (ii) a second set of functional groups that increases the wettability of the particle surface. For example, in some embodiments, the treating step may comprise exposing the particle surface to (i) at least one silane comprising a functional group from the first set of functional groups, and (ii) at least one silane comprising a functional group from the second set of functional groups.

The present invention is even further directed to methods of making chromatography columns or cartridges containing functionalized particulate support material. In one exemplary embodiment the method of making a chromatography column or cartridge comprises: (1) sealing a first end of a tubular structure; (2) at least partially filling a column cavity of the tubular structure with functionalized particulate support material of the present invention; (3) at least partially filling the column cavity of the tubular structure with a slurry of the functionalized particulate support material; and, (4) sealing an opposite end of the tubular structure. The resulting chromatography column or cartridge may be incorporated into a chromatography apparatus and utilized to separate a sample.

The present invention is also directed to methods of using functionalized particulate support material, columns or cartridges, and apparatus to detect the presence of one or more target molecules (e.g., one or more biomolecules) in a given sample. In one exemplary embodiment, the method of separating a target molecule comprises separating a mixture potentially containing at least one target molecule (e.g., a biomolecule such as a protein or peptide), wherein the method comprises bringing the sample containing at least one target molecule (e.g., a biomolecule such as a protein or peptide) into contact with the herein-disclosed functionalized particulate support material of the present invention. For example, the disclosed methods of separating samples may be used to isolate the presence of at least one biomolecule comprising an antibody, a protein, a peptide, a polypeptide, a non-peptidyl compound, an oligonucleotide, a derivative thereof, an analogue thereof, or any combination thereof.

These and other features and advantages of the present invention will become apparent after a review of the following detailed description of the disclosed embodiments and the appended claims.

BRIEF DESCRIPTION OF THE FIGURES

The present invention is further described with reference to the appended figures, wherein.

DETAILED DESCRIPTION OF THE INVENTION

Figure 1:
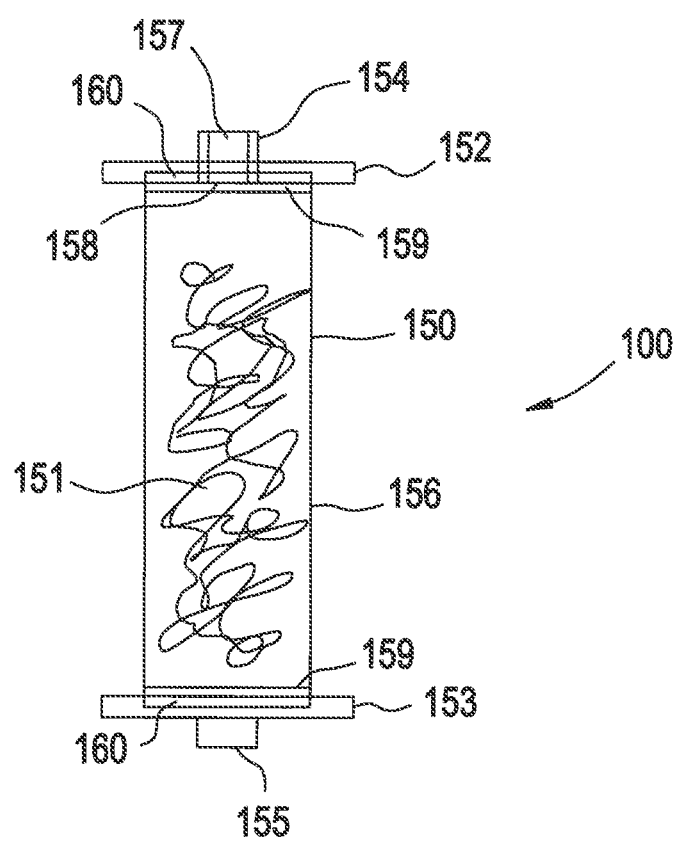
FIG. 1 depicts a view of an exemplary chromatography device of the present invention.

The present invention is directed to functionalized particulate support material suitable for use in chromatography columns or cartridges, such as in liquid chromatography (e.g., high performance liquid chromatography (HPLC) or flash). The present invention is further directed to chromatography columns or cartridges comprising functionalized particulate support material. The present invention is even further directed to methods of making functionalized particulate support material and chromatography columns or cartridges, as well as methods of using functionalized particulate support material and chromatography columns or cartridges to analyze samples, including complex mixtures (e.g., mixtures containing biological components), which potentially contain one or more target molecules.

It must be noted that as used herein and in the appended claims, the singular forms "a", "and", and "the" include plural referents unless the context clearly dictates otherwise. Thus, for example, reference to "an oxide" includes a plurality of such oxides and reference to "oxide" includes reference to one or more oxides and equivalents thereof known to those skilled in the art, and so forth. "About" modifying, for example, the quantity of an ingredient in a composition, concentrations, volumes, process temperatures, process times, recoveries or yields, flow rates, and like values, and ranges thereof, employed in describing the embodiments of the disclosure, refers to variation in the numerical quantity that may occur, for example, through typical measuring and handling procedures; through inadvertent error in these procedures; through differences in the ingredients used to carry out the methods; and like proximate considerations. The term "about" also encompasses amounts that differ due to aging of a formulation with a particular initial concentration or mixture, and amounts that differ due to mixing or processing a formulation with a particular initial concentration or mixture. Whether modified by the term "about" the claims appended hereto include equivalents to these quantities.

As used herein, the term "biomolecule" means any molecule that is produced by a living organism, including large molecules such as proteins, polysaccharides, lipids, and nucleic acids; and small molecules such a primary metabolites, secondary metabolites, and natural products. Examples of biomolecules include cells and cell debris; proteins and peptides; nucleic acids, such as DNA and RNA; endotoxins; viruses; vaccines and the like. Other examples of biomolecules include those recited in WO 2002/074791 and U.S. Pat. No. 5,451,660.

As used herein, "inorganic oxides" is defined as binary oxygen compounds where the inorganic component is the cation and the oxide is the anion. The inorganic material includes metals may also include metalloids. Metals include those elements on the left of the diagonal line drawn from boron to polonium on the periodic table. Metalloids or semi-metals include those elements that are on the right of this line. Examples of inorganic oxides include silica, alumina, titanic, zirconia, etc., and mixtures thereof.

As used herein, "particles" includes particles comprised of inorganic materials, organic materials, or combinations of inorganic materials (e.g., metals, semi-metals, and their alloys; ceramics, including inorganic oxides; etc.) and organic materials (e.g., organic polymers), such as composite materials, which are heterogeneous or homogeneous in nature. For example, heterogeneous composite materials include mere mixtures of materials, layered materials, core-shell, and the like. Examples of homogeneous composite materials include alloys, organic-inorganic polymer hybrid materials, and the like. The particles may be a variety of different symmetrical, asymmetrical or irregular shapes, including chain, rod or lath shape. The particles may have different structures including amorphous or crystalline, etc. The particles may include mixtures of particles comprising different compositions, sizes, shapes or physical structures, or that may be the same except for different surface treatments. Porosity of the particles may be intraparticle or interparticle in cases where smaller particles are agglomerated to form larger particles. In one exemplary embodiment the particles are composed of inorganic materials such as inorganic oxides, sulfides, hydroxides, carbonates, silicates, phosphates, etc, but are preferably inorganic oxides, which may be formed via any known process including, but not limited to, solution polymerization such as for forming colloidal particles, continuous flame hydrolysis such as for forming fused particles, gelation such as for forming gelled particles, precipitation, spraying, templating, sol-gel, and the like.

As used herein, the term "functionalized" means particles that have been surface modified by reaction with functional compound to alter the selectivity of at least a portion of the particle surface, including the surface area on the external portion of the particles, and/or on the surface area of the internal pores. The functionalized surface may be used to form a bonded phase (covalently or ionically), a coated surface (e.g., reverse phase C18 bonded), a clad surface (e.g., carbon clad as in EP6), a polymerized surface (e.g., ion exchange), an inherent surface (e.g., inorganic/organic hybrid material), or the like. For example, reacting inorganic particles with octadecyltrichlorosilane forms a "reverse phase" by covalently bonding the silane to the inorganic surface (e.g., C4, C8, C18, etc.). In another example, reaction of the inorganic particles with aminopropyltrimethoxysilane followed by quaternization of the amino group forms an "anion exchange phase", In a third example, a bonded phase may be formed by reaction of the inorganic particles with aminopropyltrimethoxysilane followed by formation of an amide with an acid chloride. Other bonded phases include diol, cyano, cation, affinity, chiral, amino, C18, hydrophilic interaction (HILIC), hydrophobic interaction (HIC), mixed mode, size exclusion, etc. As part of the bonded phase or functionalized surface, a ligand may be used to show specific interaction with the target molecule or biomolecule (e.g., ligate), such as those set forth in U.S. Pat. No. 4,895,806.

As used herein, the term "average molecular weight" is defined as meaning the molar mass average of molecular weights of a polymer that possesses a distribution of molecular weights due to different numbers of repeating units in each polymer chain. This value is measured using gel permeation chromatography (GPC) analysis.

As used herein, the term "chromatography" means the process passing a mixture dissolved in a mobile phase through a stationary phase (i.e., chromatography media) housed in a column or cartridge or other container, which separates a target molecule from other molecules in the mixture and allows it to be isolated. Depending upon the type of chromatography used, the target molecule may be adsorbed onto the stationary phase while the undesired components are passed through the device, or vice versa. The term "liquid chromatography" is a form of chromatography where a liquid is used as the mobile phase and a solid or a liquid on a solid support as the stationary phase. The term "flash chromatography" means liquid chromatography that is conducted under a positive pressure (e.g., up to 300 psi). The term "high performance liquid chromatography" (HPLC) means liquid chromatography that is conducted under a high positive pressure (e.g., up to 5000 psi). The term "preparatory chromatography" means HPLC for the isolation and purification of a target compound or molecule. The term "fast protein liquid chromatography" (FPLC) is a form of HPLC useful for the separation of biomolecules.

As used herein, the term "impurities" means materials present in the inorganic particles, other than the inorganic.

As used herein, the term "irregular" as it applies to the inorganic particles means that the particle shape from one particle to the next is not uniform (i.e., random particle shape) with an aspect ratio of greater than 1.0.

As used herein, the term "housing" means vessel or container for holding a stationary phase for use in chromatography, and includes cartridges, columns, tubes, devices, beds, bags, and the like.

As used herein, the term "stationary phase" or "chromatography media" or "chromatography support" means a material that shows different affinities for different components in a sample mixture, which is used in chromatography to separate a target molecule from a mixture of one or more other molecules. Stationary phases include organic and inorganic materials, or hybrids thereof and may be in the form of particles, monoliths, membranes, coatings, and the like that have been functionalized, as defined herein.

In one embodiment of the present invention, the functionalized particulate support material comprises a particle having a particle surface; and a combination of functional groups extending from the particle surface, the combination of functional groups comprising (i) a first set of functional groups that enable polymerization of one or more monomers onto the particle surface by forming a covalent bond between the first set of functional groups and said one or more monomers and (ii) a second set of functional groups that increases the wettability of the particle surface. In exemplary embodiments of the present invention, the particle comprises an inorganic metal oxide particle (or particles), such as a silica or silica gel particle (or particles).

In another embodiment of the present invention, the functionalized particulate support material comprises a particle having a particle surface; and a combination of functional groups extending from the particle surface, the combination of functional groups comprising (i) a first set of functional groups on the particle surface bonded to at least one polymer that extends from the particle surface, and (ii) a second set of functional groups that increases the wettability of the particle surface.

In a further embodiment of the present invention, the functionalized particulate support material comprises a particle having a particle surface and a median pore size of at least 150 Å; and a first set of functional groups extending from the particle surface, said first set of functional groups on the particle surface bonded to at least one polymer that extends from the particle surface. In another embodiment, the functionalized support material includes a second set of functional groups that increases the wettability of said particle surface.

In one exemplary embodiment, the second functional group of the functionalized particulate support material may be bonded to the one or more monomers or to the particle surface. In another embodiment the first set of functional groups comprises unsaturated bonds, such as vinyl groups, allyl groups, acryl groups, methacryl groups, or any combination thereof. In another embodiment, the second set of functional groups comprises at least one hydrophilic organic group, such as hydroxyl groups, diol groups, oxyethylene groups, polyethylene groups, carboxylic acid groups, amine groups, amide groups, or any combination thereof. In a further embodiment, the first set of functional groups includes vinyl groups, and the second set of functional groups includes diol groups. In another embodiment, the first and second set of functional groups may be part of a molecule including azo groups and carboxylic acid groups. In a further embodiment, at least a portion of said first set of functional groups is polymerized with one or more monomers and one or more spacer monomers so as to form polymer chains extending from the particle surface. The spacer monomer separates the one or more monomers from each other, which may assist in functional group orientation on the polymer. The one or more monomers may include anionic or cationic monomers. In an embodiment where the one or more monomers may be an anionic monomer, the monomer may be 2-acrylamido-2-methylpropane sulfonic acid, and the one or more optional spacer monomers may be methylenebisacrylamide. In an embodiment where the one or more monomer(s) may be a cationic monomer, the one or more monomers may include 3-aorylamidopropyltrimethylammonium chloride or methylacrylamidopropyltrimethylammonium chloride, and the one or more optional spacer monomers may include diallyldimethylammonium chloride. In another embodiment, the polymerization includes a chain transfer agent that reduces the chain length or molecular weight of the polymer, the chain transfer agent may include sulfur groups, thiol carbonyl groups, thiol ester groups, thiol carbonate groups and combinations thereof. In another embodiment, the polymer chains comprise identical or different repeating units of the following formula

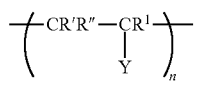

wherein $R^1$ is H or $CH_3$;

R' and R" are each independently H or $CH_3$;

Y is

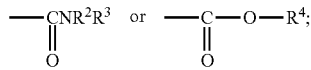

$R^2$ and $R^3$ are each independently (a) $C_{1-10}$-alkyl, phenyl, phenyl-$C_{1-10}$-alkyl, cycloalkyl, $C_{1-10}$-alkyl-cycloalkyl or $C_{1-10}$-alkylphenyl, (b) one of the above groups in (a) monosubstituted or polysubstituted by each of amino, mono- or dialkylamino, trialkylammonium, carboxyl, or sulfonyl, (c) a cyclic or bicyclic radical having 5-10 C atoms, wherein one or more CH or $CH_2$ groups is replaced by (i) N or NH, (ii) N or NH and S, or (iii) N or NH and O, or (d) one of $R^2$ or $R^3$ is H;

and wherein $R^2$ and $R^3$ are coordinated with one another so that either both radicals are acidic or basic, or one of the radicals is neutral and one is acidic or basic; and $R^4$ is $C_{1-10}$-alkyl, phenyl, phenyl-$C_{1-10}$-alkyl, cycloalkyl or $C_{1-10}$-alkyl-cycloalkyl, or $C_{1-10}$-cycloalkylphenyl, each monosubstituted or polysubstituted by each of amino, mono- or dialkylamino, trialkylammonium, carboxyl, or sulfonyl; and n is 2 to 1000.

The present invention is further directed to rigid support materials suitable for use in on exchange columns, such as exemplary rigid support material 151 shown in FIG. 1. The rigid support materials of the present invention, preferably an inorganic support, comprise one or more of the following components.

Inorganic supports suitable for use in the present invention include products commercially available as chromatographic media. The inorganic support may be prepared using methods known in the art. The inorganic substrate provides support for one or more additional components applied to a surface of the inorganic substrate. In general, the inorganic substrate is an inorganic oxide, more suitably an inorganic metal oxide, silicate or aluminosilicate or controlled pore glass. An inorganic metal oxide is more desirable. Inorganic oxides suitable for use in the present invention typically have free hydroxyl groups capable of bonding to or reacting with other chemical functionalities Desirably, the inorganic oxide has about 1 to about 10 hydroxyl groups per square nanometer of solid inorganic oxide.

Suitable inorganic oxides include, but are not limited to, silica such as chromatographic grade silica or silica gel, alumina, silica-alumina, zirconia, zirconate, controlled pore glass or titanic. In one desired embodiment of the present invention, the inorganic metal oxide is silica, more desirably, chromatographic grade silica or silica gel. Magnetically responsive inorganic oxides, such as siliceous oxide-coated magnetic particles disclosed in WO 98/31461 (the disclosure of which is incorporated herein in its entirety by reference) may also be used in the present invention. Mixed inorganic oxides, e.g. co-gels of silica and alumina, or co-precipitates may also be used.

The solid inorganic oxides may be in a physical form of particulates, fibers plates, or a combination thereof. Desirably, the solid inorganic oxides are in a physical form of particulates or particles having a substantially spherical shape. Regardless of the physical form, the solid inorganic oxides typically have a longest dimension (i.e., length, width or diameter) of up to about 150 micrometers (μm). When the solid inorganic metal oxide comprises a plurality of particles having a substantially spherical shape, the plurality of particles desirably have a median particle diameter ranging from about 1 μm to about 120 μm. In one desired embodiment of the present invention, the solid inorganic metal oxide comprises a plurality of silica or silica gel particles having a substantially spherical shape, wherein the plurality of silica or silica gel particles have a median particle diameter ranging from about 10 μm to about 130 μm, or from about 20 μm to about 120 μm.

A variety of commercially available solid inorganic oxides may be used in the present invention. Suitable solid inorganic oxides include, but are not limited to, silica particles commercially available from W. R. Grace & Co., (Columbia, Md.) under the trade designation DAVIS®, which are irregular shaped with a median pore size of about 300 Å to about 3000 Å, desirably from about 500 Å to about 1500 Å, or VYDAC® silica having a spheriodal shape and a median pore size of about 300 Å. In one desired embodiment of the present invention, VYDAC® silica having a spheriodal shape and an initial median pore size of about 300 Å is used after being modified to increase the median pore size to about 800 Å. Organic materials include agarose gel, polystyrene divinylbenzene (PSDVB) resins, poly(methylmethacrylate) resin or the like. Hybrid materials include ethylene-bridged silica hybrid particles made by the sol-gel method, such as Xterra® articles available from Waters Corp.

The surfaces of the above-described inorganic supports are treated or modified (i.e., functionalized) in order to reduce non-specific, non-selective binding and/or adsorption of non-target molecules (i.e., non-specific binding of materials other than the target molecule) and ligand-specific target molecules (i.e., non-specific binding of the target molecule (i.e. ligate) to reactive sites other than reactive sites provided by the one or more ligands) onto the inorganic substrate. The resulting modified support surface has (i) less affinity for non-target molecules (i.e., materials other than the target molecule) due to the presence of relatively inert R groups on the inorganic surface, and (ii) a controlled amount of reactive sites for selectively bonding to one or more ligands (described below) to the inorganic substrate surface directly or through a linker. The amount of reactive sites for selectively bonding to one or more ligands leads to selective, controlled binding of one or more molecules of interest to the one or more ligands attached to the inorganic support surface.

The present invention is further directed to methods of making the above-described functionalized particulate support material. In another embodiment, the present invention includes a method of making a functionalized particulate support material by treating a particle surface of a particle so as to result in a combination of functional groups extending from the particle surface, the combination of functional groups comprising (i) a first set of functional groups that enable polymerization of one or more monomers onto the particle surface via the first set of functional groups, and (ii) a second set of functional groups that increases the wettability of the particle surface. In another emodiment the treating step may include exposing the particle surface to (i) at least one silane having a functional group from the first set of functional groups, and (ii) at least one silane having a functional group from the second set of functional groups. In another embodiment, the treating step bonds at least one of the first set of functional groups or second set of functional groups to the particle surface followed by the polymerization. In one exemplary embodiment, the second functional group of the functionalized particulate support material may be bonded to the one or more monomers or to the particle surface. In another embodiment the first set of functional groups comprises unsaturated bonds, such as vinyl groups, allyl groups, acryl groups, methacryl groups, or any combination thereof. In another embodiment, the second set of functional groups comprises at least one hydrophilic organic group, such as hydroxyl groups, diol groups, oxyethylene groups, polyethylene groups, carboxylic acid groups, amine groups, amide groups, or any combination thereof, in a further embodiment, the first set of functional groups includes vinyl groups, and the second set of functional groups includes diol groups. In another embodiment, the first and second set of functional groups may be part of a molecule including azo groups and carboxylic acid groups. In another exemplary embodiment, the particle surface is further treated prior to polymerization with a quaternary ammonium salt (e.g., tetramethylammonium chloride) or a quaternary ammonium cation (e.g., tetramethylammonium cation), which is subsequently removed from the particle surface by washing. In a further embodiment, at least a portion of said first set of functional groups is polymerized with one or more monomers and one or more spacer monomers so as to form polymer chains extending from the particle surface. The one or more monomers may include anionic or cationic monomers. In an embodiment where the one or more monomers may be an anionic monomer, the monomer may be 2-acrylamide-2-methylpropane sulfonic acid, and the one or more optional spacer monomers may be methylenebisacrylamide. In an embodiment where the one or more monomer(s) may be a cationic monomer, the one or more monomers may include 3-acrylamidopropyltrimethylammonium chloride or methylacrylamidopropyltrimethylammonium chloride, and the one or more optional spacer monomers may include diallyldimethylammonium chloride. In another embodiment, the polymerization includes a chain transfer agent that reduces the chain length or molecular weight of the polymer, the chain transfer agent may include sulfur groups, thiol carbonyl groups, thiol ester groups, thiol carbonate groups and combinations thereof. In another embodiment, the polymer chains comprise identical or different repeating units of the following formula

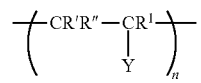

wherein
$R^1$ is H or $CH_3$;
R' and R" are each independently H or $CH_3$;
Y is qq

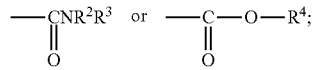

$R^2$ and $R^3$ are each independently
(a) $C_{1-10}$-alkyl, phenyl, phenyl-$C_{1-10}$-alkyl, cycloalkyl, $C_{1-10}$-alkyl-cycloalkyl or $C_{1-10}$-alkylphenyl,
(b) one of the above groups in (a) monosubstituted or polysubstituted by each of amino, mono- or dialkylamino, trialkylammonium, carboxyl, or sulfonyl,
(c) a cyclic or bicyclic radical having 5-10 C atoms, wherein one or more CH or $CH_2$ groups is replaced by (i) N or NH, (ii) N or NH and S or (iii) N or NH and O, or
(d) one of $R^2$ or $R^3$ is H;
and wherein $R^2$ and $R^3$ are coordinated with one another so that either both radicals are acidic or basic, or one of the radicals is neutral and one is acidic or basic; and
$R^4$ is $C_{1-10}$-alkyl, phenyl, phenyl-$C_{1-10}$-alkyl, cycloalkyl or $C_{1-10}$-alkyl-cycloalkyl, or $C_{1-10}$-cycloalkylphenyl, each monosubstituted or polysubstituted by each of amino, mono- or dialkylamino, trialkylammonium, carboxyl, or sulfonyl; and n is 2 to 1000.

In another exemplary embodiment, the particle surface is further treated after polymerization to remove any unattached polymer or monomer by exposing the particle surface to a salt solution, such as a 5 wt % sodium chloride solution.

In another exemplary embodiment of the invention, the carbon content on the particle surface after the treating step is less than or equal to about 3.5%, or less than or equal to about 3.0% by weight, or less than or equal to about 2.5% by weight, or less than or equal to about 2.0% by weight, or less than or equal to about 1.5% by weight, based upon the total weight of the particle, after being dried overnight at 70° C. In a further exemplary embodiment of the present invention, the carbon content on the particle surface after the polymerization step is at least about 3.5% by weight, or at least about 4.0% by weight, or at least about 4.5% by weight, or at least about 5.0% by weight, or at least about 5.5% by weight, based upon the total weight of the particle, after being dried overnight at 70° C. In a further exemplary embodiment according to the present invention, the ratio of carbon content on the particle surface after the polymerization step compared to the carbon content on the particle surface after the treating step is at least about 1.5, or at least about 2.0, or at least about 2.5, or at least about 3.0, or at least about 3.5, or at least about 4.0.

The present invention is directed to ion exchange columns, such as exemplary ion exchange column 11 shown in FIG. 1, comprising one or more of the following components. As used herein, the term "ion exchange column" includes columns having one or more of the following components, including ion exchange columns such as anion or cation exchange columns.

The ion exchange columns of the present invention comprise a column structure having desired dimensions, column volume, and structural integrity. Typically, the column structure comprises a tubular structure having removable end caps on both ends of the tubular structure. End caps form a leak-proof seal with the tubular structure in order to prevent material from undesirably escaping the tubular structure. An exemplary ion exchange column 100 of the present invention is shown in FIG. 1.

FIG. 1 provides a view of an exemplary chromatography column 100 of the present invention. As shown in FIG. 1, exemplary chromatography column 100 comprises a column housing 150: and media bed space 151 positioned within column housing 150. Desirably, media 151 comprises porous inorganic particles having a median pore size of at least 10 Angstroms (Å). As further shown in FIG. 1, column housing 150 typically comprises a tubular housing member 156, a first tubular housing member end cap 152, a second tubular housing member end cap 153 opposite end cap 152, a column inlet 154, and a column outlet 155. The column 100 may be packed with porous inorganic particles in the form of a slurry through column inlet 154, the column inlet comprising a central bore 157 having a passageway therein, and nozzle 158. A wide range of nozzles may be used which facilitate the distribution and even packing of slurry within the bed space. Filters 159 are each positioned on the interior face of the end caps 152, 153 and act with the tubular member 156 to define the bed space 151 and also to prevent leakage of particulate medium from the bed space 151. A distribution channel 160 is located transversely across the face of the first end cap 152 and/or second end cap 163, and is in fluid communication with filter 159. The fluid distribution channel 160 acts to facilitate radial distribution of the liquid. In a simple form, the distribution channel 160 comprises at least one circumferential and/or radial groove in the face of the first and/or second end caps 152 and 153. The groove is positioned such that it effects the circumferential and/or radial distribution of liquid emanating from nozzle 158 of inlet 154. It will be understood that a wide range of column capacities is possible, typically ranging from 0.1 to 2000 liters, and 0.1 to 100 liters when using the column as a disposable column. See also US 2008/0017579, the entire subject matter thereof incorporated herein by reference.

Column housing 150 may be formed from a variety of materials Typically, column housing 150 comprises a polymeric material, a metal material, a glass material, a ceramic material, or a composite thereof, and desirably, comprises a polymeric material. Suitable polymeric materials for forming column housing 150 include, but are not limited to any synthetic or semi-synthetic organic solids, such as plastic, that are moldable, including polyolefins.

Column housing 150 may be formed using conventional thermoforming techniques. For example, tubular housing member 156, first tubular housing member end cap 152, and second tubular housing member end cap 153 of column housing 150 may each independently be formed via a molding step. In some embodiments, tubular housing member 156 and one of (i) first tubular housing member end cap 152 and (ii) second tubular housing member end cap 153 of column housing 150 are formed via a single molding step (i.e., one of the end caps is integrally formed on one end of tubular housing member 156).

Tubular structure 150 may be made from a variety of materials and have a wall construction so as to withstand relatively high performance within tubular structure 150. Desirably, tubular structure 150 has a structural integrity that withstands a constant pressure of up to about 6000 psi (400 bar), more desirably, from about 15 psi (1 bar) to about 4500 psi (300 bar). Suitable materials for forming tubular structure 150 include, but not limited to, polymers such as polyetheretherketone (PEEK) and polypropylene; metals such as stainless steel; and inorganic materials such as glass. In one desired embodiment of the present invention, tubular structure 150 comprises polyetheretherketone (PEEK), or polycaprolactone.

Tubular structure 150 may have dimensions that vary depending on a number of factors including, but not limited to, particle size and geometry, flow rate, injection volume, number of required plates, etc. Typically, tubular structure 150 has a circular cross-sectional area, an outer diameter ranging from about 2 mm to about 5000 mm, an inner diameter ranging from about 1 mm to about 4000 mm, and an overall length ranging from about 2 mm to about 5000 mm.

End caps 152 and 153 for use with tubular structure 150 are typically formed from PEEK, and have dimensions so as to form a leak-proof seal with ends of tubular structure 150.

It should be noted that although tubular structures having a circular cross-sectional area are desired, tubular structures having other cross-sectional area are also within the scope of the present invention. Suitable cross-sectional configurations for a variety of tubular structures include, but are not limited to, square, rectangular, triangular, oblong, pentagonal and hexagonal cross-sectional configurations.

Chromatography columns and cartridges of the present invention may be prepared using the following steps:
(1) sealing a first end of a tubular structure;
(2) at least partially filling a column cavity of the tubular structure with a rigid support material, such as any of the above-described rigid support materials;
(3) at least partially filling the column cavity of the tubular structure with a first buffer solution to encapsulate the rigid support material; and, optionally
(4) sealing the opposite end (i.e., the second end) of the tubular structure.

The on exchange column may be stored for future use or may be subsequently connected to an apparatus comprising one or all of the above-described apparatus components.

The present invention is even further directed to methods of separating samples that potentially contain one or more molecules of interest. In one exemplary embodiment of the present invention, the method comprises the step of (a) introducing the sample into an ion exchange column containing a rigid support, wherein the rigid support comprises a plurality of inorganic metal oxide particles, wherein each particle comprises (i) a metal oxide substrate; (ii) a modified substrate surface that reduces non-specific binding of non-target molecules materials (i.e., non-specific binding of materials other than the target molecules) and ligand-specific target molecules (i.e., non-specific binding of the target molecules to reactive sites other than reactive sites provided by one or more ligands) to the inorganic substrate: and (iii) one or more ligands bonded to the inorganic substrate.

In further embodiments the invention provides a method of isolating a target molecule from a mixture comprising: a) contacting the mixture containing the target molecule with an ion exchange chromatography matrix where the matrix comprises 1) a solid support comprising a silica particle having a median pore size greater than 150 Å and less than 6000 Å and a mean particle size greater than 20 micrometer and 2) ion exchange ligand having specificity for the target molecule linked to the solid support; and b) eluting the target molecule from the ion exchange chromatography matrix.

In yet other embodiments the invention provides a method of isolating a target molecule from a mixture comprising: a) contacting the mixture containing the target molecule with an chromatography matrix, wherein the ion exchange chromatography matrix is contained within a housing, such as a column, and wherein the column packed with the ion exchange chromatography matrix has a maximum flow rate of at least 400 cm/hr, and wherein the matrix comprises 1) a silica particle and 2) an ion exchange ligand having specificity for the target molecule, wherein the dynamic capacity of the matrix for the target molecule is at least 45 g/liter at 10% breakthrough; and optionally b) eluting the target molecule from the ion exchange chromatography matrix.

In yet other embodiments the invention provides a system for isolating a target molecule from a mixture comprising a) an ion exchange chromatography matrix where the matrix comprises a solid support comprising 1) a silica particle having a pore size greater than 150 Å and less than 6000 Å and a median particle size greater than 20 micrometers and less than 120 micrometers and 2) an ion exchange ligand having specificity for the target molecule linked to the solid support; and b) a housing for containing the ion exchange chromatography matrix. The system may optionally include a means to detect elution of the target molecule from the ion exchange chromatography matrix.

In further embodiments the invention provides a system for isolating a target molecule from a mixture comprising a) an ion exchange chromatography matrix wherein the ion exchange chromatography matrix is contained within a housing, such as a column, wherein the column packed with the ion exchange chromatography matrix has a maximum flow rate of at least 400 cm/hr, and wherein the matrix comprises 1) a silica particle and 2) an ion exchange ligand having specificity for the target molecule wherein the dynamic capacity of the matrix for the target molecule is at least 45 g/liter. The system may optionally include a means to detect elution of the target molecule from the ion exchange chromatography matrix.

In other embodiments the invention provides a container comprising an ion exchange chromatography matrix comprising a silica particle having a median pore size greater than 150 Å and less than 6000 Å and a median particle size greater than 20 micrometers and less than 120 micrometers and at least one container.

In further embodiments the invention provides a device comprising an ion exchange chromatography matrix, wherein the ion exchange chromatography matrix is contained within a housing, such as a column, wherein the column packed with the ion exchange chromatography matrix has a maximum flow rate of at least 400 cm/hr, and wherein the matrix comprises 1) a silica particle and 2) an ion exchange ligand having specificity for the target molecule wherein the dynamic capacity of the matrix for the target molecule is at least 45 g/liter and at least one container.

The method of separating a sample may comprise the steps of (a) allowing the sample to come into contact with the rigid support and ligands thereon; (b) rinsing the rigid support to wash away any sample components that do not bond to the ligands; (c) introducing an eluent solution into the ion exchange column so that the eluent solution comes into contact with one or more molecules bound to the ligands on the rigid support; (d) allowing the eluent solution to remain in contact with the rigid support for a period of time so as to form an eluent sample potentially containing one or more molecules; and (e) separating contents of the column to determine the presence of one or more molecules in the sample.

In this embodiment, the method of separating an eluent sample wherein the ion exchange column is in fluid communication with the ion exchange column, the method may further comprise one or more of the following steps:

(1) introducing a sample into an ion exchange column containing a rigid support capable of withstanding a column pressure of up to about 200 bar, wherein the rigid support has one or more ligands bonded thereto, wherein one or more ligands are capable of selectively bonding to one or more molecules;

(2) allowing the sample to come into contact with the rigid support and ligands thereon;

(3) rinsing the rigid support to wash away any sample components other than the one or more target molecules;

(4) introducing an eluent solution into the ion exchange column so that the eluent solution comes into contact with the one or more target molecules bound to the ligands on the rigid support; and (5) allowing the eluent solution to remain in contact with the rigid support for a period of time so as to form the eluent sample. Typically, the eluent solution remains in contact with the rigid support for a period of time ranging from about 1 minute to about 4 hours.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

The following examples describe processes in accordance with the present invention for preparing chromatography media having functional zed surfaces, including on exchange, but other surface functionalization may be used. One embodiment of the present invention shown in the examples relates to the porous inorganic media based on exchange material, which was prepared by a process which consisted of two main steps: (1) bonding of large pore silica with two silanes: (3-glycidyloxypropyl)trimethoxysilane and 3-(trimethoxysilyl)propyl methacrylate to form an initially bonded intermediate; and (2) solution polymerization of ionic monomer(s), with an azo initiator, in the presence of the initially bonded silica intermediate for either strong anion exchange media (Q-silica) or strong cation exchange media (S-silica).

Another embodiment of the invention shown in the examples was a process for the preparation Q-silica wherein, the monomers utilized were (3-acrylamidopropyl) trimethylammonium chloride, a small amount of diallyldimethylammonium chloride solution, and the initiator is 2,2'-azobis (2-methylpropionamidine)dihydrochloride (V-50 initiator).

Another embodiment of the invention shown in the examples is a process for the preparation of S-silica. The process included an extra step of washing the initially bonded intermediate with tetramethylammonium chloride solution is added to aid the polymerization. In this polymerization embodiment, the monomer is 2-acryamido-2-methyl-1-propanesulfonic acid (AMPS), and the initiator is 4,4'-azobis(cyanovaleric acid) (V-501 initiator). This polymerization uses a chain transfer agent (CTA), e.g., S,S'-Bis ($\alpha,\alpha'$-dimethyl-$\alpha''$-acetic acid)-trithiocarbonate, which is available from ABCR GmbH KG. The function of CTA is to control the chain length of the polymerization and help reduce any blockage of the pores (See FIG. 2). This process is essentially a reverse addition fragmentation chain transfer (RAFT) polymerization, a living radical polymerization process.

Many different types of porous particles were functionalized by these processes. In some of the Examples, silica gel was utilized, which were silica gels having 75 micron particle size with median pore sizes of 250, 500, 800, 1000 Å. The silica gels were prepared using the following procedure: 190 g of a 19% sulfuric acid solution was placed in a reactor equipped with an overhead stirrer and chilled to 5° C. Separately. 263 g of a solution of sodium silicate (22.9% $SiO_2$) was also chilled to 5° C. Subsequently, the sodium silicate solution was added to the sulfuric acid solution via a pump at such a rate as to add the full quantity of silicate in 15 minutes. During the addition the temperature was maintained at 5° C. After the addition was completed, the reactor was warmed to room temperature and the contents were allowed to gel without stirring. Upon gelation, the gel mass was cut in small pieces and submerged in water, in order to remove the sodium sulfate formed during the reaction. The level of sodium sulfate remaining in the material was periodically checked, as wash water was drained and fresh water was added to the gel. When the level fell below 1% the gel was suspended in water and the pH of the liquid was adjusted to pH=9.7 and the solution heated to 67° C. The temperature was maintained for 20 hours and 20 minutes. At the end of the heating period the gel was recovered by filtration and dried in a 160° C. oven until the moisture content of the gel was less than about 5% by weight. The silica gel thus obtained had a nitrogen BET surface area of 325 $m^2/g$ and a nitrogen pore volume of 1.24 cc/g Assuming cylindrical pores and using the equation: Pore Size (Angstroms)=40000XPV/SA this material exhibits a pore size of 153 Angstroms. Subsequently, the gel is milled to the desired particle size (75 microns) using an ACM and then hydrothermally treated in an autoclave at 300° C. until the desired pore size is achieved.

The particle sizes reported in the Examples were determined by light scattering using a Malvern Mastersizer 2000 available from Malvern Instruments Ltd. per ASTM B822-10. Pore size distributions are measured by mercury intrusion using an Autopore IV 9520 available from Micromeritics Instrument Corp. and by nitrogen BET using a Tristar 3000 also available from Micrometrics Instrument Cop. Pore volumes referenced herein represent mercury intrusion into pores 10,000 Å and below. BET surface areas are also obtained from the nitrogen sorption analysis. Elemental analysis of carbon and sulfur content was conducted using a LECO Carbon and Sulfur Analyzer SC-632 available from LECO Corp. Average molecular weight was determined by GPC analysis using a GPCV 2000 with RI and Viscometric Detection available from Waters Corp. The purity of the silica was measured by inductively coupled plasma (ICP) using an ICPE-9000 available from Shimadzu Corp.

Molecular weight of the samples from Examples 11-24 were determined using the following procedure: 0.5 grams surface functionalized silica samples were weighted into 50 ml centrifuge tube and 10 ml deionized water were added, followed by 2.2 mls 48% hydrofluoric acid, and after mixed thoroughly, and the samples were let stand 30 minutes. After that, boric acid, 3.5 grams, were added to sequester free fluoride and the samples were placed on wrist action shaker for 60 minutes. After centrifugation and filtration through a 0.2 μm filter with vacuum, clear supernatant were collected for analysis. The supernatants were subjected to gel permeation chromatography (GPC) analysis using a GPCV 2000 with RI and Viscometric Detection available from Waters Corp. that included Ultrahydrogel guard column and 120, 250, and 1000 columns. The solutions from above were injected into 1% aqueous potassium nitrate in mobile phase with a Waters HPLC system equipped with an RI detector. The molecule weights of the solutions were determined by using polyethylene glycol and polyethylene oxide as calibration standards. The molecular weights for the above polymers were below about 200-300 KD.

The static binding tests for Q were performed using BSA (25 mg/ml concentration in buffer) at a pH of 8.0 with 50 mM Tris HCl buffer. The binding/washing buffer was 50 mM Tris-HCl at a pH of 8.0 and the elution buffer was 50 mM/Tris-HCl/1 M NaCl at a pH of 8.0. Dried silica samples were weighted into vials, and then protein solutions in binding buffer were added. After overnight adsorption, the samples were centrifuged and supernatant separated/discarded. The silica sample was washed three times with washing buffer with centrifugation and separation. After the washing steps, elution buffer was added and the elution was repeated a second time. The UV/Vis adsorption was measured for the combined elution solution at 280 μm using a Genesys 10S Bio UV-Vis spectrophotometer available from Thermo Fisher Scientific Inc.

The static binding tests for S were performed using chicken egg white lysozyme or bovine gamma globulin (25 mg/ml concentration in buffer) at a pH of 4 0 with 50 mM HOAc/NaOAc buffer. The binding/washing buffer was 50 mM HOAc/NaOAc at a pH of 4.0 and the elution buffer was 1M NaCl in 50 mM HOAc/NaOAc M at a pH of 4.0. Dried silica samples were weighted into vials, and then protein solutions in binding buffer were added. After overnight adsorption, the samples were centrifuged and supernatant separated/discarded. The silica sample was washed three times with washing buffer with centrifugation and separation. After the washing steps, elution buffer was added and the elution was repeated a second time. The UV/Vis adsorption was measured for the combined elution solution at 280 um using a Genesys 10S Bio UV-Vis spectrophotometer available from Thermo Fisher Scientific Inc.

The dynamic binding tests were performed using Omni glass columns with 0.66 cm diameter. For 2 ml of column the column length was around 5.8 cm. Silica samples were de-fined with DI water, and then the column was slurry packed with Akta FPLC and at about 4000 cm/h linear velocity. For the breakthrough curve for Q, BSA protein in pH 8.0 50 mM Tris-HCl buffer (or lysozyme or gamma globulin in pH 4.0, 50 mM HOAc/NaOAc buffer for S) was passing through a column with Akta at about 500 or 1000 cm/h. UV-Vis signals at 280 nm were measured using a UV900 available from General Electric, and chromatograms were recorded and plotted with Microsoft Excel. Dynamic Binding Capacities (DBC) were calculated at 5% breakthrough point using the following equations:

$$DBC = \frac{(\text{Volume@5\% Breakthrough} - \text{System Volume}) \times \text{Protein Concentration}}{\text{Column Volume}}$$

Results were recorded in Tables hereafter.

Figure 2:
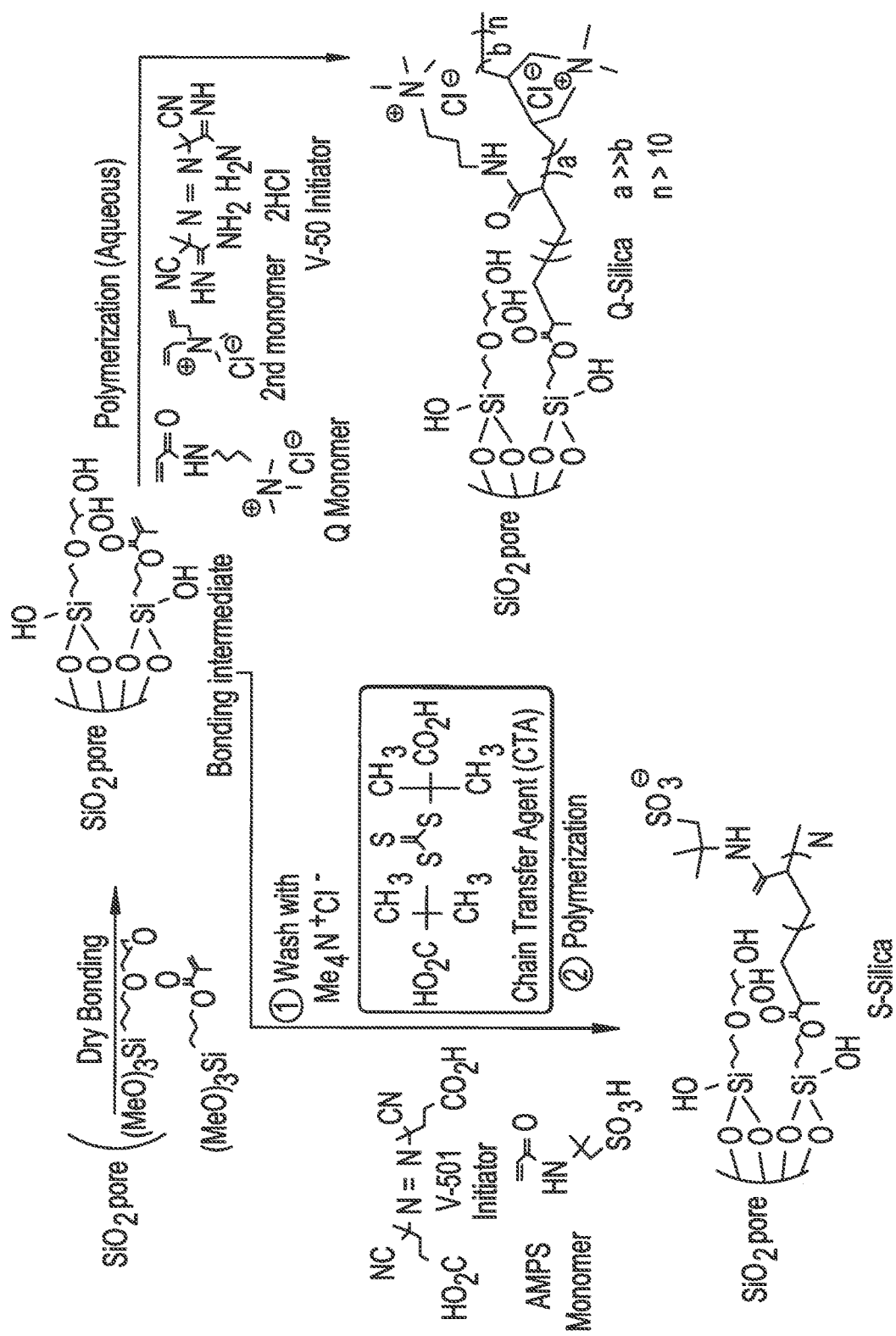
FIG. 2 depicts a reaction scheme of an exemplary embodiment of the chromatography media of the present invention.

FIG. 2 demonstrates general synthetic routes for making Q-silica and S-silica materials.

Examples 1-10

Samples of initially bonded porous silica particles were prepared by treating the particles with treating agent 1 (vinyl silane), which is 3-(trimethoxysilyl)propyl methacrylate, and/or treating agent 2 (epoxy silane), which is (3-glycidoxypropyl)-trimethoxysilane. The vinyl and epoxy silanes were premixed. A round bottom flask charged with porous particles, and the amount of treating agent mix was added into the flask. The mixture was allowed to roll overnight. 0.5M sulfuric acid in the amount of 1/10 of silica (by weight) was added. The mixture was rolled at room temperature for 1 hour, and then was heated up to 70° C. for 1 hour. The flask was allowed to cool down, and then the silica was soaked with 1 M sulfuric acid for 30 minutes, and then filtered. It was then washed with DI water five times, filtered, and dried at 70° C. overnight. The resulting samples were submitted for elemental analysis (LECO) for the percentage of carbon on silica and labeled Examples 1-10, respectively. Results for these examples are recorded in Table 1 below.

TABLE 1

| Example # | Particle Size (μm) | Center Pore Size (Å) | Surface Area (m²/g) | Particle Amount (g) | Epoxy Silane Amount (g) | Vinyl Silane Amount (g) | C % initial-bonding |
|---|---|---|---|---|---|---|---|
| 1 | 75 | 1000 | 45 | 100 | 9 | 9 | 2.75 |
| 2 | 75 | 1000 | 45 | 4000 | 240 | 240 | 2.29 |
| 3 | 75 | 1000 | 45 | 200 | 0 | 20 | 3.05 |
| 4 | 75 | 1000 | 45 | 40 | 0.5 | 0.5 | 0.92 |
| 5 | 75 | 1000 | 45 | 100 | 1.2 | 1.2 | 0.77 |
| 6 | 75 | 1000 | 45 | 200 | 2.5 | 2.5 | 0.63 |
| 7 | 75 | 800 | 61 | 200 | 2.5 | 2.5 | 0.82 |
| 8 | 75 | 500 | 72 | 40 | 1.5 | 1.5 | 2.31 |
| 9 | 75 | 500 | 72 | 40 | 0.5 | 0.5 | 0.93 |
| 10 | 75 | 250 | 297 | 150 | 7.5 | 7.5 | 2.42 |

Except for Example 3, equal amount of two silanes were used for these functionalizations and the amounts of carbon obtained were in general proportional to the total amounts of silanes used. In example 3, only vinyl silane was used for the dry bonding. As demonstrated in Table I the amount of carbon, measured by elemental analysis of the cleaned and dried silica samples after bonding process, was used as an indicator to determine the amount of surface functional groups after surface functionalization.

Examples 11-24

Examples 11-28 describe a process of preparing strong anion exchange materials (Table 2). In these Examples, the initially bonded silica from Examples 1-10 were surface treated using a first monomer: (3-Acrylamidopropyl)-trimethylammonum chloride (75% aqueous solution); an alternative monomer 1: [3-(Methacryloylamino)propyl] trimethylammonium chloride (50% aqueous solution); an alternative monomer 2: [2-(Acryloyloxy)ethyl]trimethylammonium chloride (80% aqueous solution); a second monomer: Diallyldimethylammonium chloride (65% aqueous solution); V-50 initiator; and additional deionized water (DIW).

A three-necked round bottom flask was equipped with an overhead mechanical stirrer with gas tight fitting, a nitro gas inlet and outlet, and heating mantle with thermal couple feedback. The silica and all the reagents except initiator are first charged into the flask. The system was bubbled with nitrogen for 20 minutes. Then the initiator was introduced. Nitrogen was bubbled for another 20 min before the flask is gradually heated to 65° C. The mixture was kept at 65° C. for 2 hours with overhead stirring, and then cooled down to room temperature. The mixture was poured into 5% NaCl solution in a beaker. The flask was rinsed with DI water to completely move the residual silica inside the flask. After the mixture was stirred with overhead stirrer for a few minutes, it was filtered and the washing was repeated three times with 5% NaCl and three times with DI water. The samples were left in air to dry except that a small amount of silica was dried at 90° C. overnight and then submitted for elemental analysis of carbon content. Binding capacities were calculated for the sample of described herein above. Resulting samples were labled Examples 11-24. Analytical results and binding capacities for these Examples were recorded in Table 2 below:

TABLE 2

| Example # | Silica (# from Table 1) | Silica amount (g) | Reagent Ratio (silica/monomer/2nd monomer/initiator/DIW) | C %$_{initialbonding}$ | C %$_{final}$ | C % from Polymer (C %$_{final}$ − C %$_{initialbonding}$) | $C_{poly}/C_{initialbonding}$ Ratio | Binding Capacities for BSA protein (mg/ml) |
|---|---|---|---|---|---|---|---|---|
| 11 | 1 | 10 | 1:0.5:0.04:0.0045:6.5 | 2.75 | 4.46 | 1.71 | 0.62 | 70 (D) |
| 12 | 2 | 2000 | 1:0.62:0.043:0.0046:4.0 | 2.29 | 6.24 | 3.88 | 1.72 | 103 (D) |
| 13 | 3 | 60 | 1:0.62:0.043:0.0042:3.33 | 3.05 | 3.05 | 0 | 0 | n/m |
| 14 | 2 | 20 | 1:0.62:0.021:0.005:6 | 2.29 | 6.08 | 3.83 | 1.7 | 83 (S) |

TABLE 2-continued

| Example # | Silica (# from Table 1) | Silica amount (g) | Reagent Ratio (silica/monomer/$2^{nd}$ monomer/initiator/DIW) | C %$_{initialbonding}$ | C %$_{final}$ | C % from Polymer (C %$_{final}$ − C %$_{initialbonding}$) | $C_{poly}/C_{initialbonding}$ Ratio | Binding Capacities for BSA protein (mg/ml) |
|---|---|---|---|---|---|---|---|---|
| 15 | 2 | 20 | 1:0.62:0:0.0032:6 | 2.29 | 6.05 | 3.80 | 1.7 | 76 (S) |
| 16 | 4 | 30 | 1:0.82:0.043:0.0046:6.66) | 0.92 | 5.01 | 4.09 | 4.4 | 142 (S) |
| 17 | 5 | 30 | 1:0.83 (alternative monomer 1):0.043:0.046:6.66 | 0.77 | 5.92 | 5.15 | 6.7 | 154 (S); 99 (D) |
| 18 | 5 | 30 | 1:0.83 (alternative monomer 2):0.043:0.046:6.66 | 0.77 | 3.09 | 2.32 | 3.0 | 94 (S) |
| 19 | 6 | 30 | 1:0.82:0.043:0.0046:6.66) | 0.63 | 4.73 | 4.1 | 6.5 | 139 (S) |
| 20 | 6 | 30 | 1:0.83 (alternative monomer 1):0.043:0.046:6.66 | 0.63 | 4.77 | 4.14 | 6.6 | 145 (S) |
| 21 | 7 | 30 | 1:0.82:0.043:0.0023:6.66) | 0.82 | 5.06 | 4.24 | 5.2 | 163 (S); 120 (D) |
| 22 | 8 | 30 | 1:0.82:0.043:0.0046:6.66) | 2.31 | 5.03 | 5.10 | 5.5 | 142 (S) |
| 23 | 9 | 30 | 1:0.82:0.043:0.0046:6.66) | 0.93 | 6.95 | 4.64 | 2.0 | 136 (S) |
| 24 | 10 | 30 | 1:0.75:0.036:0.0033:6.66 | 2.42 | 10.76 | 8.34 | 3.4 | 79 (S) |

Reagent ratio is the amount of reagent used in the reaction by weight. All the monomers used in Table 2 are aqueous solutions so the actual amounts are corrected by multiple by concentration. For example, in Example 11 the amount of reagents are: silica=10 g, monomer=6.6 g, $2^{nd}$ monomer=0.6 g, initiator=0.045 g, DI water=65 g, and the ratio is calculated as 10:(6.6×0.75):(0.6×0.65):0.045:65=1:0.5:0.04: 0.0045:6.5. C %$_{initial\ bonding}$ is the amount of carbon on the dried silica samples after the initial bonding step, as measured by elemental analysis. C %$_{final}$ is the amount of carbon on the purified, dried silica samples, measured by elemental analysis. $C_{poly}$=C %$_{final}$−C %$_{initial\ bonding}$ is the amount of carbon contributed from polymeric groups on the surface of the silica. $C_{poly}/C_{initialbonding}$ Ratio is the division of the two carbon numbers, which is a measure of carbon contributed by the polymer compared to that contributed by the initial bonding. While not wishing to be bound by theory, it is believed that higher ratio is an indication of longer chain polymer with fewer number of chains on the surface, and this is preferred against lower ratio indicating shorter chain with more chains on the surface for higher protein binding as longer chains give more flexibility for the bonded polymers. Bovine serum albumin (BSA) was used as model protein for all the binding tests of samples. Higher binding values are preferred. In Table 2, (S) stands for Static binding (SBC) where the binding of BSA onto modified silica was measured in a static mode (see the procedure of the measurement below). (D) stands for dynamic binding (DBC) where the binding of BSA onto modified silica was measured in dynamic flow mode (see the procedure of the measurement below). Note that n/m means not measured.

As may be seen from Table 2, except for Example 13, all of the samples provided acceptable binding results. In Example 13, no polymer attached onto the surface of silica. In Examples 14 and 15, the second monomer, diallyldimethylammonium chloride, provided higher BSA protein binding in general. In Example 16, increasing the ratio of C %$_{polymer}$/C %$_{initialbonding}$, the binding of BSA was improved. In Examples 17, 18 and 20, alternative monomers were tested. Alternative monomer 1 gave slightly higher BSA binding than a sample from the first monomer (Example 19), while alternative monomer 2 gave much lower protein binding than the first monomer. In Example 21, the sample was made with silica having a pore diameter/size of 800 Å, which yielded the highest BSA protein binding. Example 22 gave higher BSA binding than 23 because it had higher carbon number ratio. In Example 24, lower protein binding was obtained.

Examples 25-28

Examples 25-28 show another process for preparing strong anion exchange materials. The general process procedure for Initial bonding samples for Examples 25-28 (Table 3) was as follows: 50 g of dried silica were mixed with 0.6 g of vinyl silane and 0.6 g of epoxy silane in a dried 1 L round bottom flask on a Rotavap at ambient temperature for overnight (16 hours), and then the silica was transferred to a 1 L beaker and soaked with 500 ml of 1M sulfuric acid for 1 hour. Filtration and washing with 5×500 DI water yielded initially bonded silica samples which were dried at 70° C. overnight.

Examples 25-27

The Polymerization process procedure for Examples 25-27 was as follows: Similar to process used in Examples 11-24, 30 g of dried silicas from previous step were mixed with monomers, initiator and water according to Table 3. The analytical results and binding capacity measurements and calculations for the final products for Examples 25-27 were recorded in Table 3 as well.

Example 28

The polymerization process procedure for Example 28 was as follows: In a 250 ml Beaker the amount of reagents described for Example 28 in Table 3 were mixed. Stir to dissolve everything in water. The solution was poured into a 250 ml Erlenmeyer flask containing 30 g of initially bonded silica (0.76% Carbon). Nitrogen gas was bubbled into the flask for 30 mins (the flask was occasionally shaken to allow silica and aqueous solution mix well), and then the gas tubing was quickly removed and the top of the flasks were sealed with a tape. The flask was gradually heated to 65° C. with a water bath (~30 minutes), and the temperature was kept at 65° C. for 2 hours. Then the mixture was cooled down to room temperature. The mixture was poured into 400-500 ml 10% NaCl solution in a 1 L beaker with some DI water rinsing to completely move the residual silica inside the flask. The silica was stirred with a spatula for a few minutes, and then particles were left to settle. The top liquid phase supernatant was decanted into waste, and the residual silica was mixed with 500 ml 5% NaCl solution. The silica sample was then washed withb 3×500 ml of 5% NaCl solution with additional 3×500 mL DI water, each washing was followed with filtration under vacuum. The final sample was left in air to dry except a small amount of sample was dried at 90° C. for elemental analysis of carbon contents.

TABLE 3

| Examples | Average Pore size (Å) | C % from Initial Bonding | Monomer 1 (g) | Monomer 2 (g) | Initiator (g) | Water (g) | Final C % | Net C % | 5% Breakthrough DBC for BSA Protein (mg/ml) |
|---|---|---|---|---|---|---|---|---|---|
| 25 | 1000 | 0.83 | 33 | 2 | 0.14 | 200 | 4.66 | 3.83 | 115.9 |
| 26 | 2000 | 0.75 | 33 | 2 | 0.14 | 200 | 2.84 | 2.09 | 92.2 |
| 27 | 3000 | 0.77 | 33 | 2 | 0.14 | 200 | 2.47 | 1.70 | 84.4 |
| 28 | 800 | 0.76 | 16.5 | 1 | 0.07 | 100 | 5.49 | 4.73 | 129.1 |

Examples 29-38 demonstrate a process for preparing strong cation exchange material S (see FIG. 2).

Examples 29-34

Vinyl and epoxy silanes (2.5 g each) were premixed in a 20 ml scintillation vial. A 2 L round bottom flask was charged with 200 grams of D1000 silica, and the amount of treating agent mix was added into the flask drop wise with good mixing. The mixture in the flask was allowed to roll in a rotovap overnight. 20 ml of 0.5M sulfuric acid was added. The mixture was rolled at room temperature for 1 hour, and then was heated up to 70° C. for 1 hour. The flask was allowed to cool down, and then the silica was soaked with 500 ml 1 M sulfuric acid for 30 minutes, and then filtered. It was then washed with DI water five times, filtered, 100 g of tetramethylammonium chloride was dissolved in 1000 ml of methanol and the silica was soaked in this solution for 1 hour, and then the silica is filtered and washed with 3×500 ml of methanol. The silica was dried at 70° C. overnight. The sample was submitted for elemental analysis (LECO) to determine the percentage of carbon on silica. It was found that the sample contained 0.79 g of carbon per 100 g of sample (0.79%). All initial bonding for the Examples 29-34 recorded in Table 4 were prepared as described herein above.

A 500 ml three-necked round bottom flask was equipped with an overhead mechanical stirrer with gas tight fitting, a nitro gas inlet and outlet, and heating mantle with thermal couple feedback. The silica initially bonded and treated with tetramethylammonium chloride (30 g), and 37.5 g of AMPS, small amount of CTA and 200 ml of DI water were first charged into the flask. The system was bubbled with nitrogen for 20 minutes. Then 0.15 g of V501 initiator was introduced. Nitrogen was bubbled for another 20 min before the flask is gradually heated 65° C. The mixture was kept at 65° C. for 2 hours with overhead stirring, and then to 80° C. for another 2 hours. The flask was allowed to cool down to room temperature. The mixture was poured into 600 ml of 5% NaCl solution in a beaker. The flask was rinsed with DI water to completely move the residual silica inside the flask. After the mixture was stirred with overhead stirrer for a few minutes, it was filtered and the washing was repeated three times with 500 ml 5% NaCl and three times with 500 ml DI water. The sample was left in air to dry except that a small amount of silica was dried at 90° C. overnight and then submitted for elemental analysis of carbon and sulfur content.

TABLE 4

| Example # | Pore size of Silica (Å) | Initial C % | CTA used (g) | Final C % | S % | SBC (lysozyme) (mg/ml) | SBC (Globulin) (mg/ml) |
|---|---|---|---|---|---|---|---|
| 29 | 1000 | 0.74 | 0.3 | 2.88 | 0.85 | 153 | 39 |
| 30 | 1000 | 0.98 | 0.3 | 3.47 | 0.77 | 153 | 34 |
| 31 | 1000 | 0.74 | 0.2 | 3.64 | 1.01 | 166 | 19 |
| 32 | 1000 | 0.71 | 0.2 | 3.37 | 1.03 | 160 | 16 |
| 33 | 1000 | 0.74 | 0 | 6.29 | 1.61 | 68 | 2 |
| 34 | 1000 | 0.71 | 0 | 6.26 | 1.61 | 63 | 3 |

In Examples 29-34, chicken egg white lysozyme ($M_W$ of about 17 kD) and bovine gamma globulin ($M_W$ of about 140 kD) proteins were used for static binding capacity (SBC) studies for the cation exchange materials. The test procedure was the same as that for BSA for Q-Silica described above in Examples 11-24, with the exception that different proteins (still 25 mg/ml concentrations) are used, and the binding and washing buffer was 50 mM HOAc/NaOAc at pH 4.0. The elution buffer was 1 M NaCl in 50 mM HOAc/NaOAc at pH 4.0.

It was found the unlike the Q-silica, the polymerization of AMPS requires the involvement of a small amount of a chain transfer agent (CTA), e.g., S'-Bis($\alpha,\alpha'$-dimethyl-$\alpha''$-acetic acid)-trithiocarbonate. Without CTA, the binding of protein to silica samples were much lower. As can be seen from Table 4, the amount of CTA had significant influence not only on the amount of polymer (judged by carbon and sulfur contents) but also on the static binding capacity of the samples. Larger amounts of CTA led to smaller amounts of polymer attachment, lower binding of lysozyme but higher binding for the much larger size protein Globulin. With no CTA, significantly smaller binding amounts were achieved for both lysozyme and globulin.

Examples 35 and 36

Examples 35 and 36 demonstrate the size of polymers with regard to the amount of CTA used in the polymerization (without involvement of silica). A three-necked round bottom flask was charged with 37.5 g (181 mmol) of AMPS, 1.4 g (18.1 mmol) of methacrylic acid, 0.2 g (1 g for Example 32) of CTA, and 200 ml of DI water. The polymerization was carried out (without silica) similar to the one described above. After the polymerization and sample was submitted for GCP analysis to determine the molecular weight of the polymers made. It was found that $M_W$ for Example 31 was 87471 and $M_W$ for Example 32 was 20678.

Example 37

Figure 3:
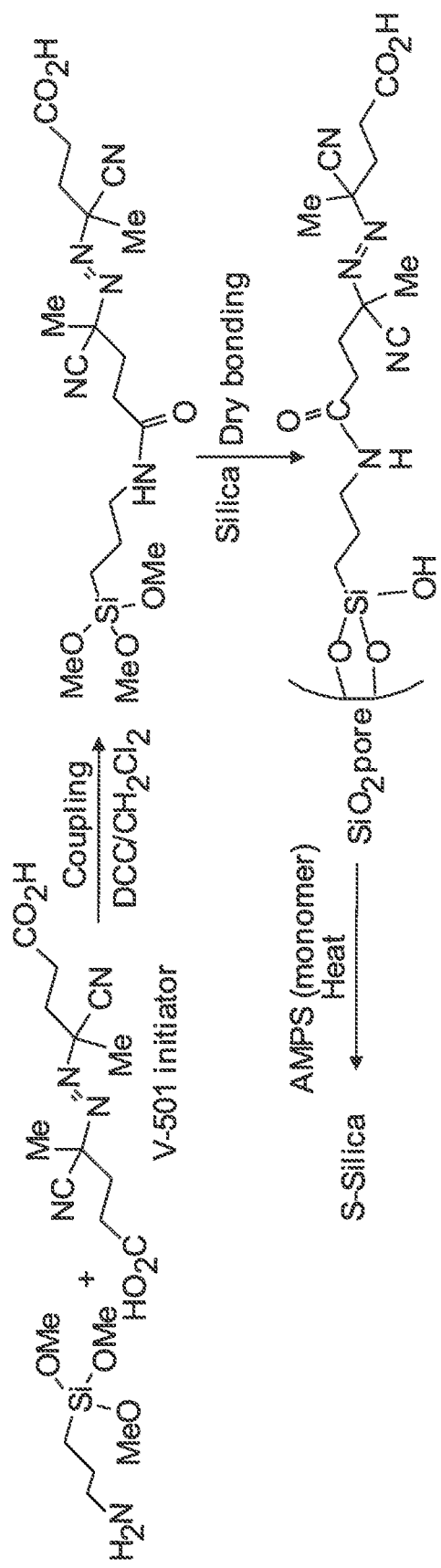
FIG. 3 depicts a reaction scheme of an exemplary embodiment of the chromatography media of the present invention.

In this Example, an alternative process for preparing strong cation exchange phase is presented. The process involves chemically attaching a functional group containing thermally labile azo group and also hydrophilic carboxylic acid groups. As shown in FIG. 3, the azo initiator is first coupled with aminopropyltrimethoxysilane, and then the functional group is bonded with silica. The polymerization proceeds with heat and in the presence of the monomers.

N,N'-Dicyclohexylcarbodiimide (DCC), 11.5 g, was dissolved in 350 ml of methylene chloride, and the solution was cooled with ice batch to about 5° C. To the solution was added 7.78 g of 4,4'-azobis (cyanovaleric acid) (V-501 initiator), followed by 10 g of aminopropyltrimethoxysilane. The mixture was stirred at cold for 3 hours, and then it was allowed to warm up to room temperature in another 2 hours. After the reaction, undissolved solids (mostly urea byproduct) were filtered off, and the filtrate was mixed with 100 g of untreated silica from Example 7 (800 Å). The mixture was place in a 1 L round bottom flask, rolled on a rotovap at room temperature overnight, and then filtered and washed with 4×400 ml of methanol. The solids were allowed to dry in air overnight at room temperature. A small amount of sample was submitted for elemental analysis, and a carbon number of 2.03% was obtained for the sample.

30 g of above silica was mixed with 40 g of AMPS monomer in 200 ml of water. After nitrogen was bubbled in the aqueous mixture for 30 min, the three necked round bottom flask was heated while stirring to 65° C. for 2 hours under nitrogen. After the reaction, the mixture was filtered and washed with 3×500 ml of 5% NaCl and then 3×500 ml of DI water. After the sample was dried, elemental analysis of the dried sample showed a carbon number of 4.23% and sulfur number of 1.17%. Static binding of BSA protein (with a pH 4.0, 50 mM sodium acetate buffer) indicated a binding capacity of BSA for this sample was 150 mg/ml.

Examples 38

Figure 4:
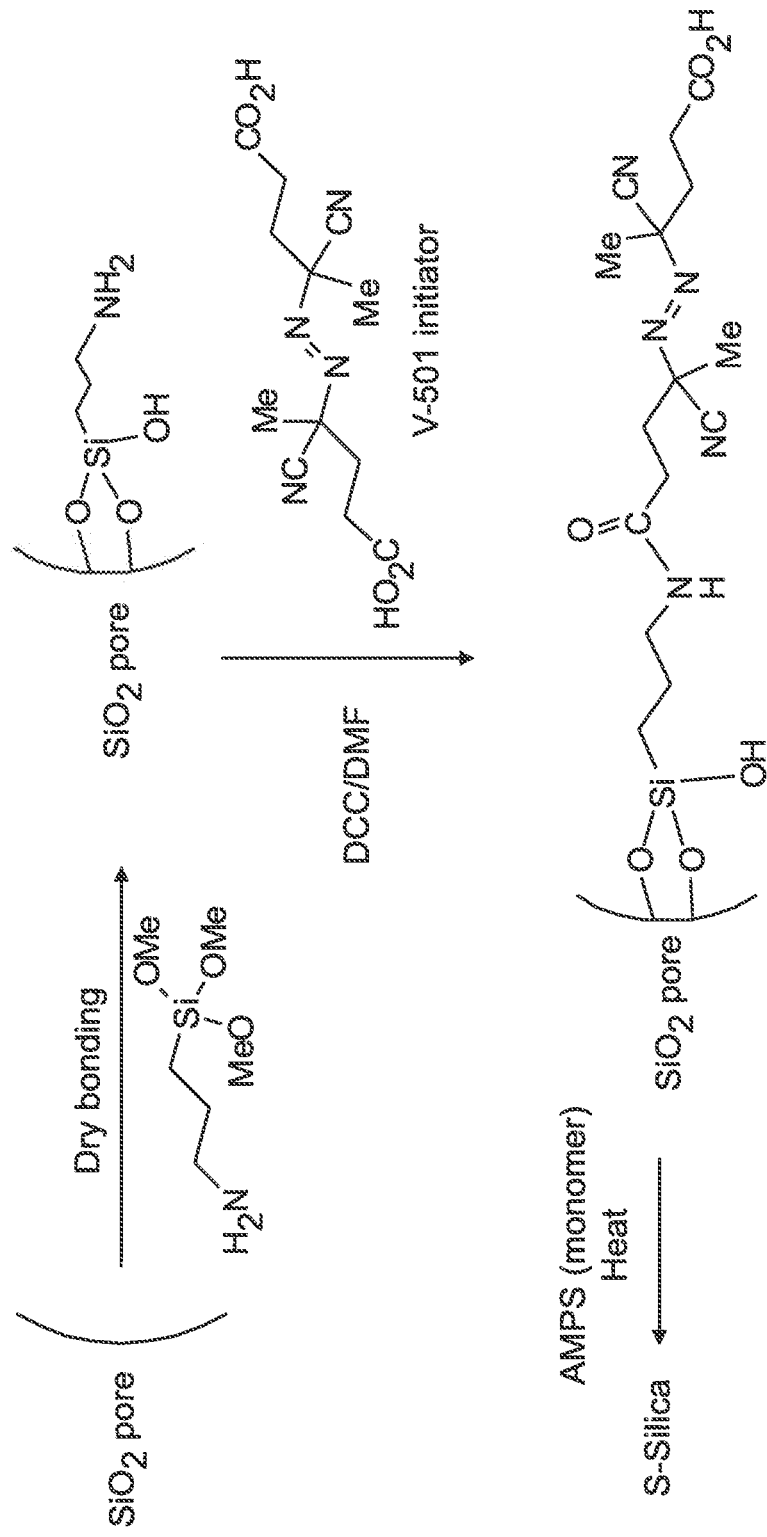
FIG. 4 depicts a reaction scheme of an exemplary embodiment of the chromatography media of the present invention.

In this Example, a different set of reactions was used to prepare strong cation exchange material. As shown in FIG. 4, silica gel was first bonded with aminopropyltrimethoxysilane, and then the modified silica was coupled with azo initiator with a coupling catalysis (DCC) in DMF, followed by polymerization at higher temperature in the presence of AMPS monomer.

D1000 (75 μm average particle size with 1000Å average pore size), 200 g, was initially bonded with 20 g of aminopropyltrimethoxysilane with a procedure similar to that of Examples 1-10. After overnight rolling, the silica was soaked in 600 ml of 0.1M HCl, and then filtered. Three times of washing with 1 L of DI water were carried out with each step followed by filtration under vacuum. The silica filtration cake was dried at 70° C. overnight and it was determined the amount of carbon with dried silica was at 0.80%.

The dried silica from above, 35 g, was mixed with solution of 1.92 g of DCC, 2.24 g of V-501 azo initiator, and 0.8 g of triethylamine in 100 ml of dry DMF solvent. The mixture was place in a 500 ml round bottom flask and rolled on a rotavap at room temperature for 4 hours. The resulting mixture was filtered and washed with 2×200 mi of DMF, and 2×150 ml of acetone. A sample was dried in oven and elemental analysis showed a carbon content of 1.74%. The remaining silica was let dry inside a fume hood at room temperature for 6 hours.

34 g of above silica were mixed with 40 g of AMPS monomer in 200 g of DI water. After the system was flushed with nitrogen for 20 minutes, it was heated while stirring to 65° C. and kept at this temperature for 2 hours. After that, the mixture was cooled down to room temperature, washed with 3×500 ml of 5% NaCl, followed by 3×500 ml of DI water. After the sample was dried, elemental analysis of the dried sample showed a carbon number of 5.47% and sulfur number of 1.69%, and a static binding (5% breakthrough) of 125 mg/ml of lysozyme protein at pH 7.0 (50 mmol phosphate buffer).

Examples 39 and 40

Figure 5:
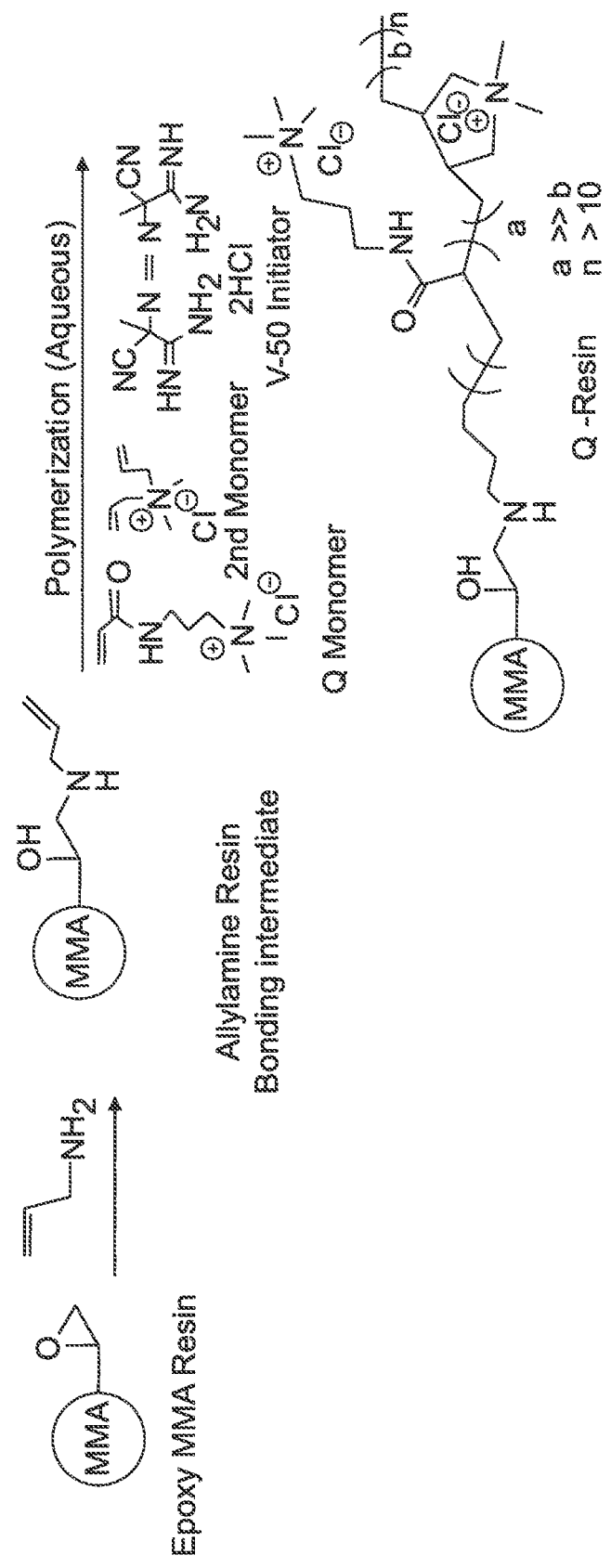
FIG. 5 depicts a reaction scheme of an exemplary embodiment of the chromatography media of the present invention.

In Examples 39 and 40, epoxy porous resin (polymethacrylate polymer resin) particles were used (see FIG. 5). Since the particles (50 μm or 100 μm average particle size) have epoxy groups which will be hydrolyzed to give did groups in aqueous media, only vinyl groups will be needed for the modification with polymerization of Q polymers. Thus, 100 g of the particles were treated with 40 ml of allylamine (available from Aldrich) in 400 ml of NMP at room temperature for 1 hour and 60° C. for 1 hour. After cooling down, the sample was filtered and washed with 3×500 ml of DI water, followed by 500 ml of methanol, and dried in air overnight. The polymerization of 30 g of above modified resin was carried out with the procedure described in Example 11. As can be seen from Table 5, both examples provided acceptable static binding of BSA protein.

TABLE 5

| Base Particle | Particle Size | C % from polymerization of Q monomers | Static Binding of BSA Protein (mg/g) |
| --- | --- | --- | --- |
| Example 39 | 50 | 7.5 | 220 |
| Example 40 | 166 | n/a | 73 |

While the invention has been described with a limited number of embodiments, these specific embodiments are not intended to limit the scope of the invention as otherwise described and claimed herein. It may be evident to those of ordinary skill in the art upon review of the exemplary embodiments herein that further modifications, equivalents, and variations are possible. All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R failing within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5%. ... 50%, 51%, 52%. ... 95%, 96%, 97%, 98%, 99%, or 100%. Moreover, any numerical range represented by any two values of R, as calculated above is also specifically disclosed. Any modifications of the invention, in addition to those shown and described herein, will become apparent to those skilled in the art from the foregoing description and accompanying drawings. Such modifications are intended to fall within the scope of the appended claims. All publications cited herein are incorporated by reference in their entirety.

What is claimed is:

1. A polymer containing material comprising a functionalized particulate support material comprising:

a silica gel particle having a particle surface and exhibiting a particle size from about 10 μm to about 120 μm;

a first surface functionalizing compound covalently bonded directly to and extending from the particle surface, wherein the first surface functionalizing compound is the reaction product of a first functional group on a first silane, one or more alkenyl monomers, and a spacer monomer, wherein the first functional group is selected from the group consisting of vinyl groups, allyl groups, acryl groups, methacryl groups, and a combination of any two or more thereof;

a second surface functionalizing compound covalently bonded directly onto the particle surface, wherein the second surface functionalizing compound is the reaction product of a second silane with hydroxyl groups on the particle surface, and the second surface functionalizing compound provides a set of functional groups comprising hydrophilic functional groups and extends from the particle surface;

wherein the first silane and the second silane are different;

wherein said first surface functionalizing compound and said second surface functionalizing compound are different; and wherein the first silane reacts with hydroxyl groups on the particle surface so as to be covalently bonded directly to and extending from the particle surface prior to reaction between the first functional group on the first silane and the one or more alkenylmonomers and the spacer monomer.

2. A polymer containing material comprising the functionalized particulate support material of claim 1, wherein the spacer monomer is an anionic or cationic monomer.

3. A polymer containing material comprising the functionalized particulate support material of claim 1, wherein said one or more alkenyl monomers comprises 2-acrylamido-2-methylpropane sulfonic acid, and said spacer monomer comprises methylenebisacrylamide.

4. The polymer containing material of claim 1, wherein said silica gel particle has a particle size ranging from about 20 μm to about 120 μm, and a median pore size of at least 150 Å.

5. The polymer containing material of claim 1, wherein said set of functional groups comprises hydroxyl groups, diol groups, oxyethylene groups, polyethylene groups, carboxylic acid groups, or any combination thereof.

6. The polymer containing material of claim 1, wherein the carbon content of the (i) first surface functionalizing compound and (ii) the second surface functionalizing compound covalently bonded directly onto said particle surface is less than or equal to about 2.0 percent by weight of the polymer containing material.

7. The polymer containing material of claim 1, wherein said first silane comprises (3-trimethoxysilyl) propyl) methacrylate, and said second silane comprises (3-glycidyloxypropyl) trimethoxysilane.

8. The polymer containing material of claim 1, wherein (i) said first functional group comprises a vinyl group, and (ii) said set of functional groups comprises hydroxyl groups or diol groups.

* * * * *

UNITED STATES PATENT AND TRADEMARK OFFICE
CERTIFICATE OF CORRECTION

| | | |
|---|---|---|
| PATENT NO. | : 11,529,610 B2 | Page 1 of 1 |
| APPLICATION NO. | : 14/374795 | |
| DATED | : December 20, 2022 | |
| INVENTOR(S) | : Feng Gu | |

It is certified that error appears in the above-identified patent and that said Letters Patent is hereby corrected as shown below:

In the Claims

Claim 1, shown on Line 25, Column 25 reading:
"alkenylmonomers"

Should be changed to:
--alkenyl monomers--

Signed and Sealed this
Fourteenth Day of February, 2023

*Katherine Kelly Vidal*

Katherine Kelly Vidal
*Director of the United States Patent and Trademark Office*